United States Patent
Bulthaup et al.

(10) Patent No.: US 8,093,731 B2
(45) Date of Patent: Jan. 10, 2012

(54) GEARLESS HUMAN POWER GENERATION

(75) Inventors: Colin Bulthaup, San Francisco, CA (US); Saul Griffith, San Francisco, CA (US); Dan Goldwater, Berkeley, CA (US); Corwin Hardham, San Francisco, CA (US); George Homsy, San Francisco, CA (US); Eric Wilhelm, Oakland, CA (US); Brian Warshawsky, San Francisco, CA (US); Mitch Heinrich, Oakland, CA (US); Michael Lin, San Francisco, CA (US); John Lewis, San Francisco, CA (US)

(73) Assignee: Potenco, Inc., San Francisco, CA (US)

( * ) Notice: Subject to any disclaimer, the term of this patent is extended or adjusted under 35 U.S.C. 154(b) by 216 days.

(21) Appl. No.: 11/983,427

(22) Filed: Nov. 7, 2007

(65) Prior Publication Data

US 2008/0150493 A1    Jun. 26, 2008

Related U.S. Application Data

(60) Provisional application No. 60/861,999, filed on Nov. 29, 2006, provisional application No. 60/864,772, filed on Nov. 7, 2006.

(51) Int. Cl.
*F02B 63/04* (2006.01)
*F03G 7/08* (2006.01)
*H02K 7/18* (2006.01)

(52) U.S. Cl. .................................. 290/1 R; 206/37.1
(58) Field of Classification Search .............. 290/1 R; 206/37.1
See application file for complete search history.

(56) References Cited

U.S. PATENT DOCUMENTS

| | | | |
|---|---|---|---|
| 2,338,263 A | 1/1944 | Schaefer | 144/28.71 |
| 2,561,601 A | 7/1951 | Szonnell | 446/263 |
| 2,843,333 A | 7/1958 | Jones | 242/226 |
| 2,991,584 A | 7/1961 | Kaufman | 446/235 |
| 3,246,424 A | 4/1966 | Gregory | 446/40 |
| 3,370,855 A | 2/1968 | Lindsay | 369/66 |
| 3,389,915 A | 6/1968 | Owen et al. | 369/30.02 |
| 3,408,766 A | 11/1968 | Ajero | 446/255 |
| 3,410,564 A | 11/1968 | Duncan et al. | 369/66 |
| 3,466,050 A | 9/1969 | Sindlinger | 369/30.02 |
| 3,468,546 A | 9/1969 | Duncan et al. | 369/65 |
| 3,477,728 A | 11/1969 | Lindsay et al. | 369/67 |
| 3,525,527 A | 8/1970 | Sindlinger | 369/30.02 |
| 3,545,328 A | 12/1970 | Abrams | 84/94.1 |
| 3,546,808 A | 12/1970 | Kohner et al. | 446/249 |
| 3,555,720 A | 1/1971 | Dattilo | 446/41 |

(Continued)

OTHER PUBLICATIONS

Bullis, Kevin. "Powering the $100 Laptop" [online]. Jul. 2006. [Retrieved on Jul. 29, 2008]. Retrieved from the Internet: <URL: http://www.technologyreview.com/read_article.aspx?id=17194&ch=infotech&a=f>.

*Primary Examiner* — Pedro J Cuevas
(74) *Attorney, Agent, or Firm* — Van Pelt, Yi & James LLP

(57) ABSTRACT

An electric power generation system is disclosed. The electric power generation system comprises a string configured to be pulled. The electric power generation system further comprises a bobbin configured to rotate when the string is unwound from the bobbin. The electric power generation system further comprises an electric power generator having a rotor. The rotor is configured to rotate such that the ratio of number of rotations of the rotor and the bobbin is 1:1 when the string is being pulled.

16 Claims, 18 Drawing Sheets

U.S. PATENT DOCUMENTS

| | | | |
|---|---|---|---|
| 3,561,861 A | 2/1971 | Mayer | 353/95 |
| 3,635,479 A | 1/1972 | Osante | 369/66 |
| 3,664,673 A | 5/1972 | Weiss et al. | 369/66 |
| 3,721,039 A | 3/1973 | Cook et al. | 446/178 |
| 3,788,509 A | 1/1974 | Keeler | 215/324 |
| 3,792,490 A | 2/1974 | Wigal | 360/62 |
| 3,796,284 A | 3/1974 | Zeigner et al. | 185/39 |
| 3,834,071 A | 9/1974 | Terzian et al. | 446/353 |
| 3,848,467 A | 11/1974 | Flavell | 482/4 |
| 3,851,418 A | 12/1974 | Barlow et al. | 446/338 |
| 3,859,749 A | 1/1975 | Morin et al. | 446/145 |
| 3,873,817 A | 3/1975 | Liang | 700/287 |
| 3,879,887 A | 4/1975 | Brookson et al. | 446/220 |
| 3,904,210 A | 9/1975 | Licitis | 369/66 |
| 3,920,503 A | 11/1975 | Keeler | 156/580.2 |
| 3,922,813 A | 12/1975 | Terzian et al. | 446/354 |
| 4,057,904 A | 11/1977 | Vrabel et al. | 33/700 |
| 4,082,267 A | 4/1978 | Flavell | 482/6 |
| 4,145,885 A | 3/1979 | Solell | 60/504 |
| 4,207,989 A | 6/1980 | Ingemann | 220/266 |
| 4,228,360 A | 10/1980 | Navarro | 290/43 |
| 4,261,562 A | 4/1981 | Flavell | 482/6 |
| 4,339,889 A | 7/1982 | Guerrero et al. | 446/306 |
| 4,360,860 A * | 11/1982 | Johnson et al. | 362/192 |
| 4,413,441 A | 11/1983 | Hunter et al. | 446/305 |
| 4,433,404 A | 2/1984 | Watanabe | 369/66 |
| 4,455,614 A | 6/1984 | Martz et al. | 700/288 |
| 4,483,096 A | 11/1984 | Gabler et al. | 446/430 |
| RE31,759 E | 12/1984 | Ingemann | 220/276 |
| 4,539,484 A | 9/1985 | Suggs | 290/53 |
| 4,626,336 A | 12/1986 | Bloomquist et al. | 204/298.16 |
| 4,663,009 A | 5/1987 | Bloomquist et al. | 204/192.2 |
| 4,670,820 A | 6/1987 | Eddins et al. | 362/86 |
| 4,674,741 A | 6/1987 | Pasierb et al. | 482/72 |
| 4,678,184 A | 7/1987 | Neiger et al. | 482/4 |
| 4,701,835 A | 10/1987 | Campagnuolo et al. | 362/192 |
| 4,770,279 A | 9/1988 | Shiozaki et al. | 192/45 |
| 4,790,921 A | 12/1988 | Bloomquist et al. | 204/192.12 |
| 4,834,363 A | 5/1989 | Sargeant et al. | 482/61 |
| 4,930,770 A | 6/1990 | Baker | 482/95 |
| 4,938,475 A | 7/1990 | Sargeant et al. | 482/9 |
| 5,066,867 A | 11/1991 | Shim | 290/53 |
| 5,067,601 A | 11/1991 | Castens | 192/65 |
| 5,116,294 A | 5/1992 | Findlay | 482/52 |
| 5,219,053 A | 6/1993 | Castens | 192/45 |
| 5,231,954 A | 8/1993 | Stowe | 123/3 |
| 5,343,991 A | 9/1994 | Premiski et al. | 192/45 |
| 5,359,229 A | 10/1994 | Youngblood | 290/53 |
| 5,363,130 A | 11/1994 | Cowger et al. | 347/43 |
| 5,434,454 A | 7/1995 | Farkas | 290/4 R |
| 5,796,240 A | 8/1998 | Saito et al. | 322/10 |
| 5,798,632 A | 8/1998 | Muljadi | 322/29 |
| 5,919,115 A | 7/1999 | Horowitz et al. | 482/6 |
| 6,034,492 A | 3/2000 | Saito et al. | 318/141 |
| 6,082,122 A * | 7/2000 | Madenokouji et al. | 62/77 |
| 6,125,978 A | 10/2000 | Ando et al. | 192/41 A |
| 6,133,642 A | 10/2000 | Hutchinson | 290/1 A |
| 6,178,523 B1 | 1/2001 | Klein | 714/24 |
| 6,230,496 B1 | 5/2001 | Hofmann et al. | 60/706 |
| 6,288,463 B1 | 9/2001 | Tada et al. | 310/75 B |
| 6,346,784 B1 | 2/2002 | Lin | 318/9 |
| 6,406,349 B1 | 6/2002 | Chung | 446/235 |
| 6,425,248 B1 * | 7/2002 | Tonomura et al. | 60/641.8 |
| 6,525,996 B1 | 2/2003 | Miyazawa | 368/204 |
| 6,607,420 B2 | 8/2003 | Chung | 446/235 |
| 6,659,922 B1 | 12/2003 | Yu | 482/127 |
| 6,664,759 B1 | 12/2003 | Goris | 320/107 |
| 6,676,056 B2 | 1/2004 | Peter | 242/374 |
| 6,855,016 B1 | 2/2005 | Jansen | 440/6 |
| 6,914,340 B2 | 7/2005 | Becker et al. | 290/1 R |
| 6,924,571 B2 | 8/2005 | Bye | 310/75 A |
| 7,015,676 B2 * | 3/2006 | Kohama et al. | 320/150 |
| 7,019,495 B2 | 3/2006 | Patterson | 322/7 |
| 7,021,978 B2 | 4/2006 | Jansen | 440/6 |
| 7,045,912 B2 | 5/2006 | Leijon et al. | 290/42 |
| 7,071,659 B1 | 7/2006 | Torrey et al. | 318/254.1 |
| 7,087,001 B1 * | 8/2006 | Ihli | 482/115 |
| 7,105,982 B1 | 9/2006 | Hagood et al. | 310/319 |
| 7,129,592 B1 | 10/2006 | Yetter | 290/1 A |
| 7,164,212 B2 | 1/2007 | Leijon et al. | 290/42 |
| 7,180,258 B2 | 2/2007 | Specht et al. | 318/432 |
| 7,219,497 B2 * | 5/2007 | Kowatari et al. | 60/608 |
| 7,319,278 B2 | 1/2008 | Gehring | 290/53 |
| 7,747,355 B2 * | 6/2010 | Bulthaup et al. | 700/287 |
| 7,775,843 B1 | 8/2010 | Vanderhye | 440/8 |
| 7,791,213 B2 | 9/2010 | Patterson | 290/53 |
| 2002/0033020 A1 * | 3/2002 | Tonomura et al. | 60/641.8 |
| 2002/0094749 A1 | 7/2002 | Chung | 446/235 |
| 2002/0125360 A1 | 9/2002 | Peter | 242/374 |
| 2003/0042741 A1 * | 3/2003 | Hartman et al. | 290/1 C |
| 2003/0066923 A1 | 4/2003 | Peter | 242/374 |
| 2004/0043873 A1 | 3/2004 | Wilkinson et al. | 482/54 |
| 2004/0056461 A1 | 3/2004 | Blackburn | 280/741 |
| 2004/0204294 A2 | 10/2004 | Wilkinson et al. | 482/54 |
| 2004/0249340 A1 | 12/2004 | Britto et al. | 604/74 |
| 2004/0263099 A1 | 12/2004 | Maslov et al. | 318/400.24 |
| 2005/0006961 A1 * | 1/2005 | Shen | 310/50 |
| 2005/0012487 A1 | 1/2005 | Skeist et al. | 318/727 |
| 2005/0083000 A1 | 4/2005 | Specht et al. | 318/432 |
| 2005/0121915 A1 | 6/2005 | Leijon et al. | 290/42 |
| 2005/0124471 A1 | 6/2005 | Wilkinson | 482/121 |
| 2005/0178632 A1 | 8/2005 | Ross | 191/10 |
| 2005/0183493 A1 | 8/2005 | Bell et al. | 73/37 |
| 2005/0184689 A1 | 8/2005 | Maslov et al. | 318/400.41 |
| 2005/0247814 A1 | 11/2005 | Prokscha et al. | 242/390.8 |
| 2005/0284976 A1 | 12/2005 | Holbein et al. | 242/374 |
| 2006/0090466 A1 * | 5/2006 | Kowatari et al. | 60/608 |
| 2006/0094965 A1 | 5/2006 | Voss et al. | 600/485 |
| 2006/0097096 A1 | 5/2006 | Heckmayr | 242/374 |
| 2006/0192386 A1 | 8/2006 | Rome | 290/1 R |
| 2006/0208606 A1 | 9/2006 | Hirzel | 310/268 |
| 2006/0267406 A1 | 11/2006 | Mehrer et al. | 307/9.1 |
| 2007/0037667 A1 | 2/2007 | Gordon | 482/51 |
| 2007/0108767 A1 | 5/2007 | Hirose et al. | 290/1 A |
| 2007/0145745 A1 | 6/2007 | Woods et al. | 290/1 A |
| 2007/0151872 A1 | 7/2007 | Vincent | 206/37.1 |
| 2007/0164568 A1 | 7/2007 | Greenspan et al. | 290/53 |
| 2007/0176426 A1 | 8/2007 | Hirose et al. | 290/1 A |
| 2007/0205350 A1 | 9/2007 | Shimada et al. | 248/652 |
| 2008/0048509 A1 | 2/2008 | Murakami et al. | 310/51 |
| 2008/0048510 A1 | 2/2008 | Onodera et al. | 310/52 |
| 2008/0054858 A1 | 3/2008 | Uchimi et al. | 322/17 |
| 2008/0067982 A1 | 3/2008 | Dooley | 322/22 |
| 2008/0150378 A1 | 6/2008 | Heinrich et al. | 310/78 |
| 2008/0150493 A1 | 6/2008 | Bulthaup et al. | 322/1 |
| 2008/0150495 A1 | 6/2008 | Bulthaup et al. | 322/7 |
| 2008/0157531 A1 | 7/2008 | Bulthaup et al. | 290/50 |
| 2008/0157536 A1 | 7/2008 | Bulthaup et al. | 290/1 R |
| 2008/0157540 A1 | 7/2008 | Fattal | 290/40 R |
| 2008/0157615 A1 | 7/2008 | Bulthaup et al. | 310/89 |
| 2008/0157635 A1 | 7/2008 | Bulthaup et al. | 310/68 R |
| 2008/0157636 A1 | 7/2008 | Bulthaup et al. | 310/75 B |
| 2008/0157637 A1 | 7/2008 | Bulthaup et al. | 310/75 R |
| 2008/0202447 A1 | 8/2008 | Kochi et al. | 123/2 |
| 2008/0208115 A1 | 8/2008 | Kliegman et al. | 604/74 |
| 2008/0231234 A1 | 9/2008 | Mah | 320/138 |
| 2009/0121496 A1 | 5/2009 | Jabaji et al. | 290/40 B |
| 2009/0197743 A1 | 8/2009 | Schmidt | 482/52 |
| 2010/0102565 A1 | 4/2010 | Gartner | 290/54 |
| 2010/0144496 A1 | 6/2010 | Schmidt | 482/70 |

* cited by examiner

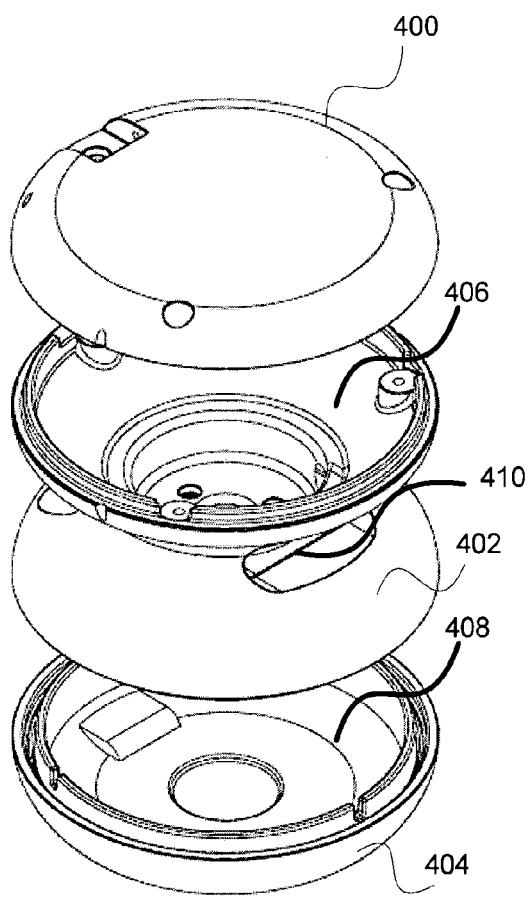
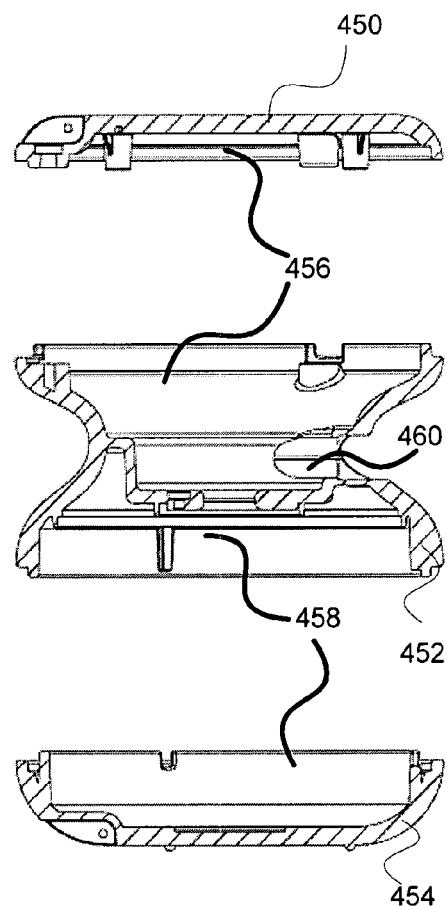
FIG. 4A
FIG. 4B

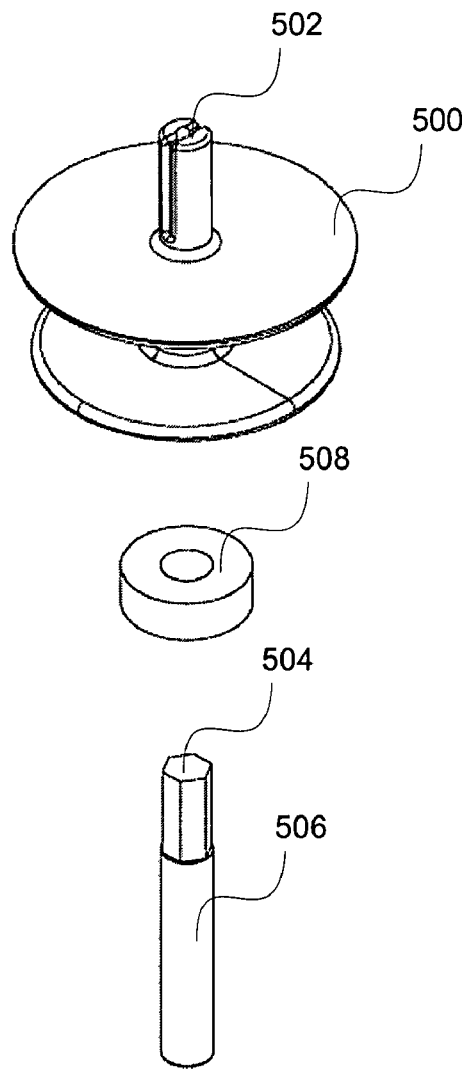
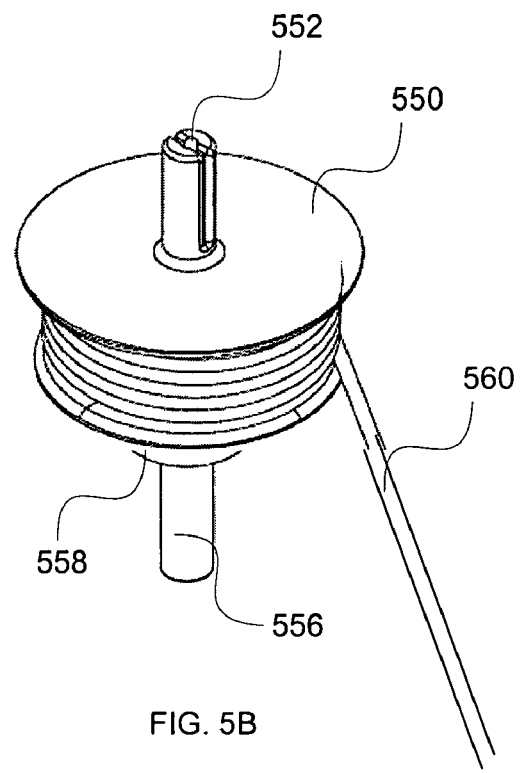
FIG. 5A
FIG. 5B

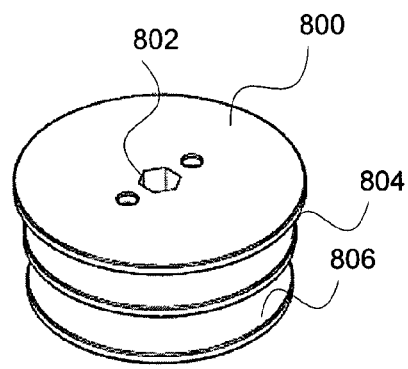
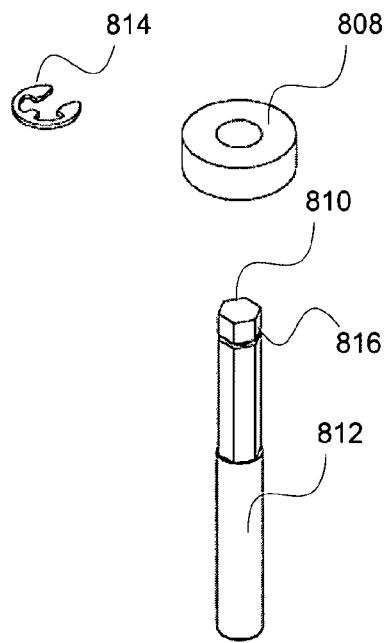
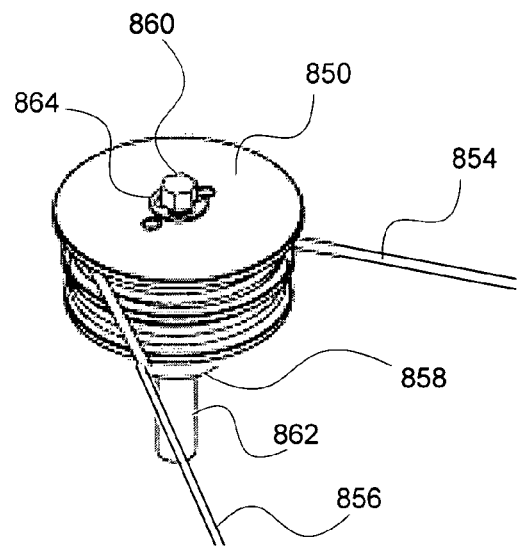
FIG. 8A
FIG. 8B

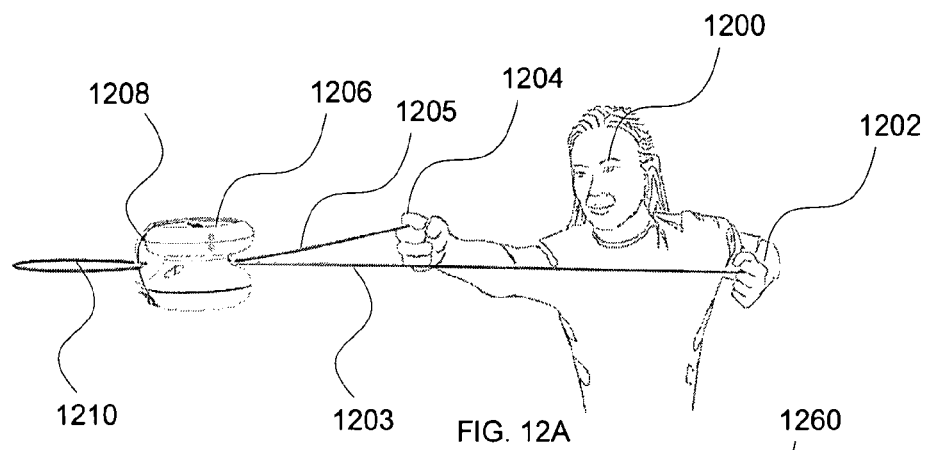
FIG. 12A
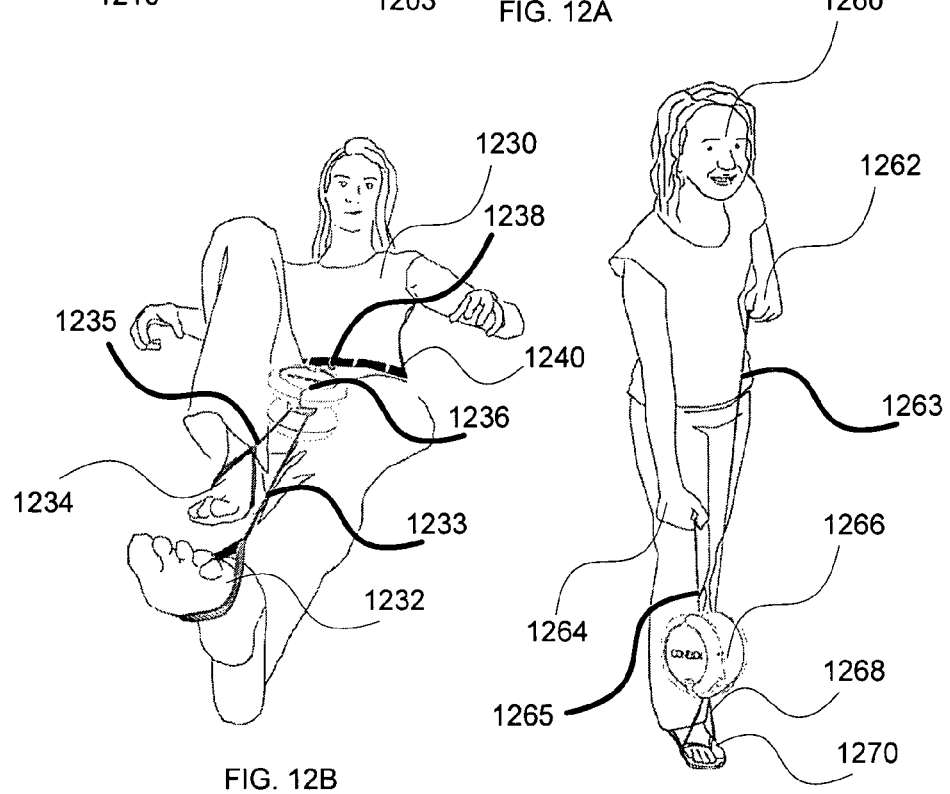
FIG. 12B
FIG. 12C

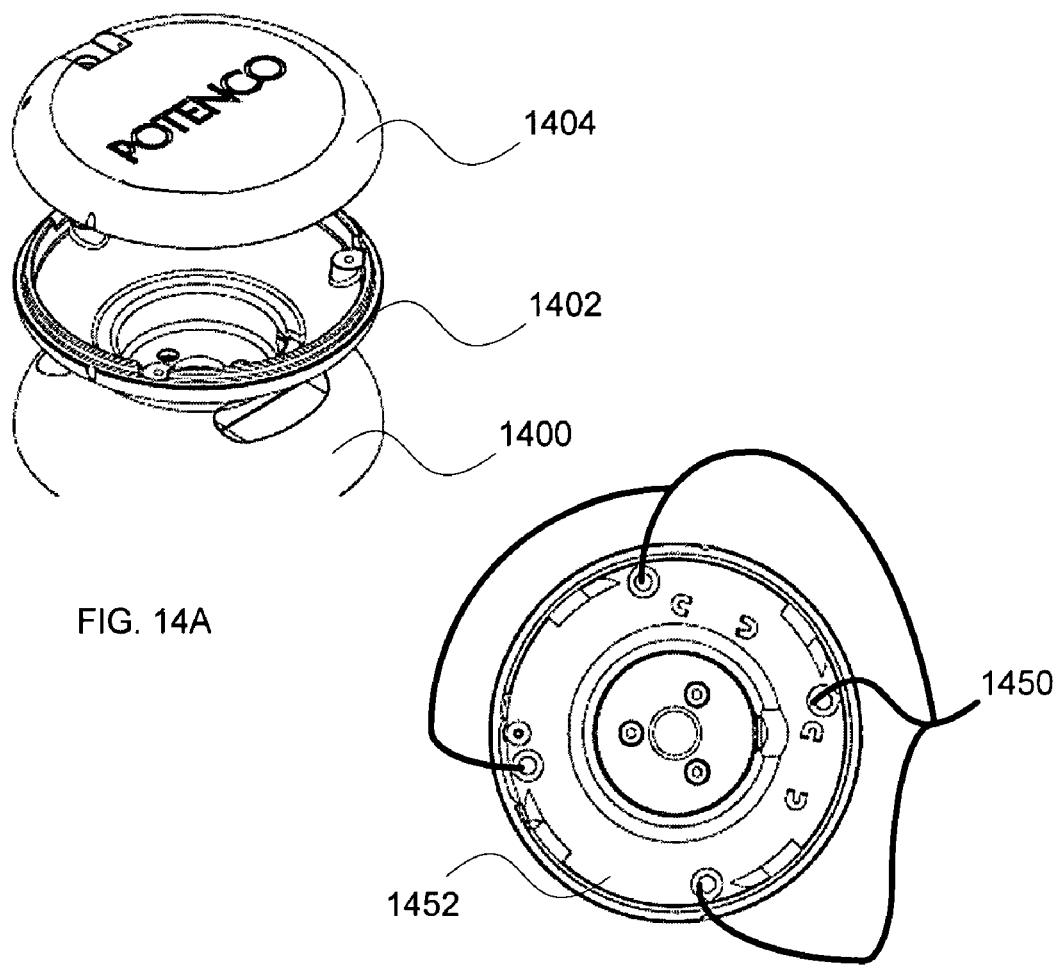

GEARLESS HUMAN POWER GENERATION

CROSS REFERENCE TO OTHER APPLICATIONS

This application claims priority to U.S. Provisional Patent Application No. 60/861,999 entitled SMART HUMAN POWER GENERATION filed 29 Nov. 2006 which is incorporated herein by reference for all purposes.

This application claims priority to U.S. Provisional Patent Application No. 60/864,772 entitled SMART HUMAN POWER GENERATION filed 7 Nov. 2006 which is incorporated herein by reference for all purposes.

BACKGROUND OF THE INVENTION

Modern appliances provide many useful functions. Typically, appliances require power to function. In some cases, the power is provided by electricity that is distributed by infrastructure enabling convenient access (e.g., from a wall outlet). In other cases, batteries are used. However, in some situations infrastructure is not present (e.g., in remote areas or in third world countries) and/or batteries are not available or cannot provide sufficient power.

BRIEF DESCRIPTION OF THE DRAWINGS

Various embodiments of the invention are disclosed in the following detailed description and the accompanying drawings.

FIGS. 4A and 4B are diagrams illustrating embodiments of a case for a human power generating system.

FIGS. 5A and 5B are diagrams illustrating embodiments of a shaft, sealed bearing, and bobbin of a human power generating system.

FIGS. 8A and 8B are block diagrams illustrating embodiments of a shaft, sealed bearing, and bobbin of a human power generating system.

FIGS. 12A, 12B, and 12C are diagrams illustrating embodiments of a human power generating system.

FIGS. 14A and 14B are diagrams illustrating embodiments of connector systems for a power generating unit case.

DETAILED DESCRIPTION

Figure 1:
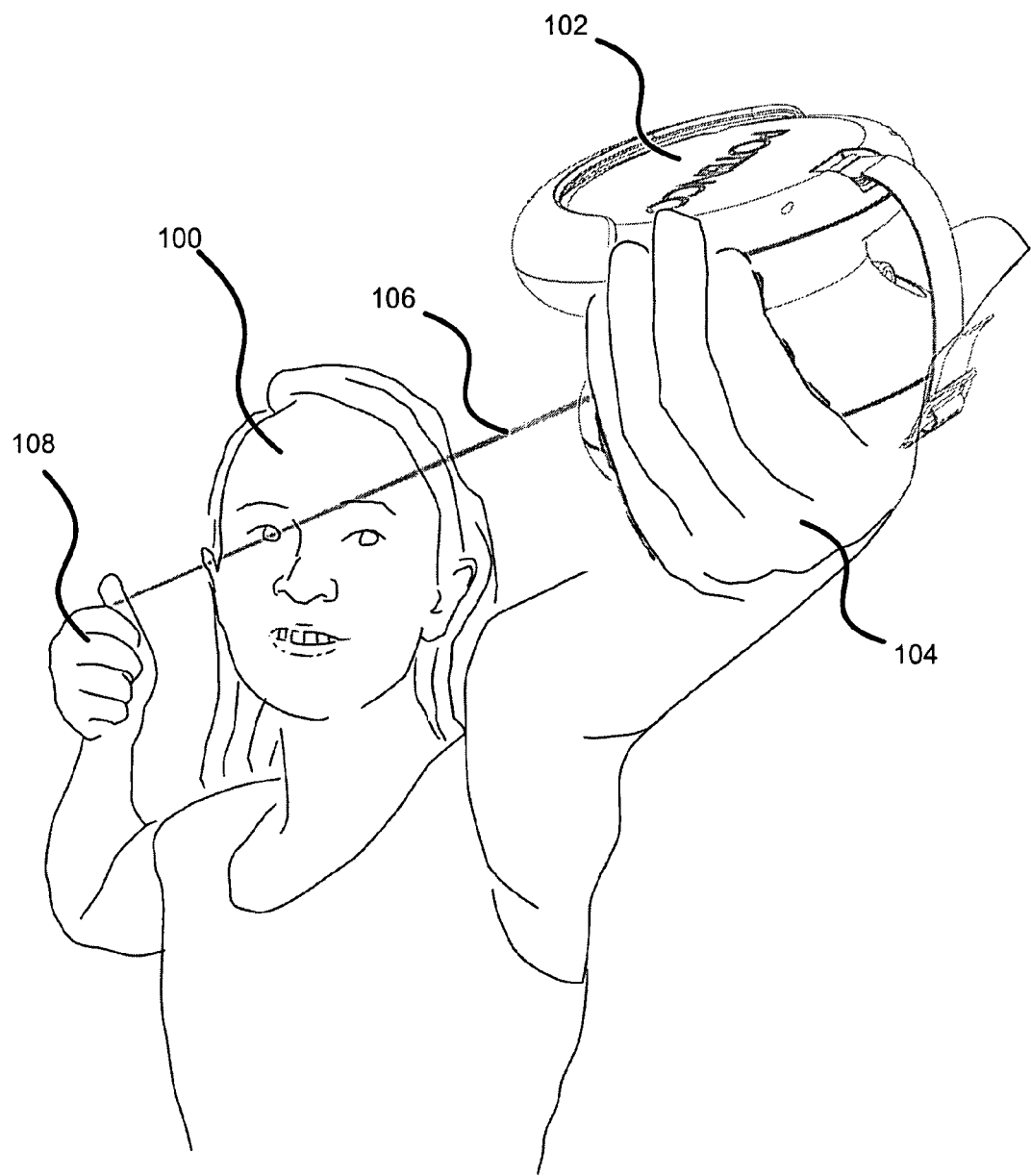
FIG. 1 is a diagram illustrating an embodiment of a human power generating system.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Human power generation is disclosed. A durable handheld portable human power generation system that is able to provide sufficient power to supply an appliance such as a computer has a number of constraints placed on its system. For example, durability implies keeping the number of breakable (e.g., moving) parts down, and handheld and portable imply constraining the size of the unit. Gears can be used to increase the spinning speed of a generator to increase the output voltage, but have the draw back of taking up space and being a moving part that can wear out.

A gearless power generating unit is disclosed. A string is configured to be pulled. The string is configured such that a large motion (e.g., a full arm pull, a step, etc.) is used to pull the string. A bobbin is configured to rotate when the string is unwound from the bobbin as the string is pulled. An electric power generator having a rotor that is configured to rotate such that the number of rotations of the rotor and the bobbin is 1:1 when the string is being pulled. The string is rewound on the bobbin when the string is retracting. In various embodiments, a spring, a motor driven using a retraction circuit (e.g., the electric power generator used as a motor), or any other appropriate force source is used to retract the string. The bobbin is coupled to a shaft. The shaft is coupled to a clutch, and the clutch is coupled to the rotor of the electric power generator. The clutch enables the shaft rotation when the string is being pulled to rotate the rotor. The clutch does not enable the shaft rotation when the string is being retracted to rotate the rotor.

In some embodiments, when the string is being retracted, the power generating unit can continue to output power if the power is stored in a rotating mass (e.g., a steel cap included as part of the rotor), a battery or a capacitor. In some embodiments, an output power limiter is used to limit output power of the power generating unit such that output power is available when the string is being retracted by ensuring that there is power remaining in the stored rotating mass, battery, or capacitor that can be drawn on during the time when the string is retracting.

In some embodiments, retraction of the string is caused using a second string. The second string is wound on the bobbin such that when the first string unwinds, the second string winds, and when the second string unwinds, the first string winds. A user can pull alternately on one string and then the other. A spring or motor is not required to rewind the string, and a clutch is not required to connect the shaft to the rotor. A mass or electrical storage is also not required to enable the power generating unit to output power when the first string is retracted. In some embodiments, the first and second string comprise one string, wherein the middle of the string is coupled to the bobbin and one end of the string is used as the first string and the other end of the string is used as the second string.

In some embodiments, the string is anchored at one end to the case of the power generating unit. The other end of the string is wound and unwound on the bobbin. The string is pulled by pulling on a wheel around which the string is passed. Pulling on the wheel unwinds the string from the bobbin on one end and pulls against the other end anchored on the case. A pull of the wheel of a distance 'x' away from the case causes the string to be unwound a distance twice 'x' from the bobbin. A user can generate more power using the extra wheel configuration since the bobbin will rotate twice as fast. The extra wheel configuration acts as a pulley. A user pulls on a handle which is coupled to the wheel.

In some embodiments, a power generating unit is anchored to a fixed object enabling a user to operate the power generating unit without holding the unit in one hand. The power generating unit is anchored using an integral anchoring attachment. For example, a strap is coupled to the power generating unit case on both ends, where one end is coupled using a detachable coupler (e.g., a hook, a clip, a snap, etc.).

The electric power generating unit includes a sealed chamber and a chamber that can be opened. The sealed chamber protects the electric power generator from environmental contamination. The chamber that can be opened allows the string, bobbin, and spring (if appropriate) to be accessed. The sealed chamber is sealed using a sealed bearing around a shaft between the sealed chamber and the chamber that can be opened. The sealed chamber is sealed using the bottom of the case coupled to the middle hour-glass shaped case.

In various embodiments, a power generating unit is mechanically coupled to an animal, the wind, a water wheel, or any other appropriate source of mechanical energy.

FIG. 1 is a diagram illustrating an embodiment of a human power generating system. In the example shown, user 100 holds power generation unit 102 in hand 104. User 100 pulls on string 106 using hand 108. In some embodiments, hand 108 pulls on a handle (not shown in FIG. 1) that attaches to string 106. String 106 mechanically causes a generator in power generation unit 102 to produce electric power. String 106 has a length that is sufficient to allow a long pulling motion from user 100. In various embodiments, one hand is used to pull on string 106, two hands are used to pull on string 106, one foot/leg is used to pull on string 106, two feet/legs are used to pull on string 106, or any other appropriate human mechanical motion.

In some embodiments, an appropriate mechanical motion source other than human is used to pull on string 106—for example, an animal motion, a wind motion, etc.

Figure 2:
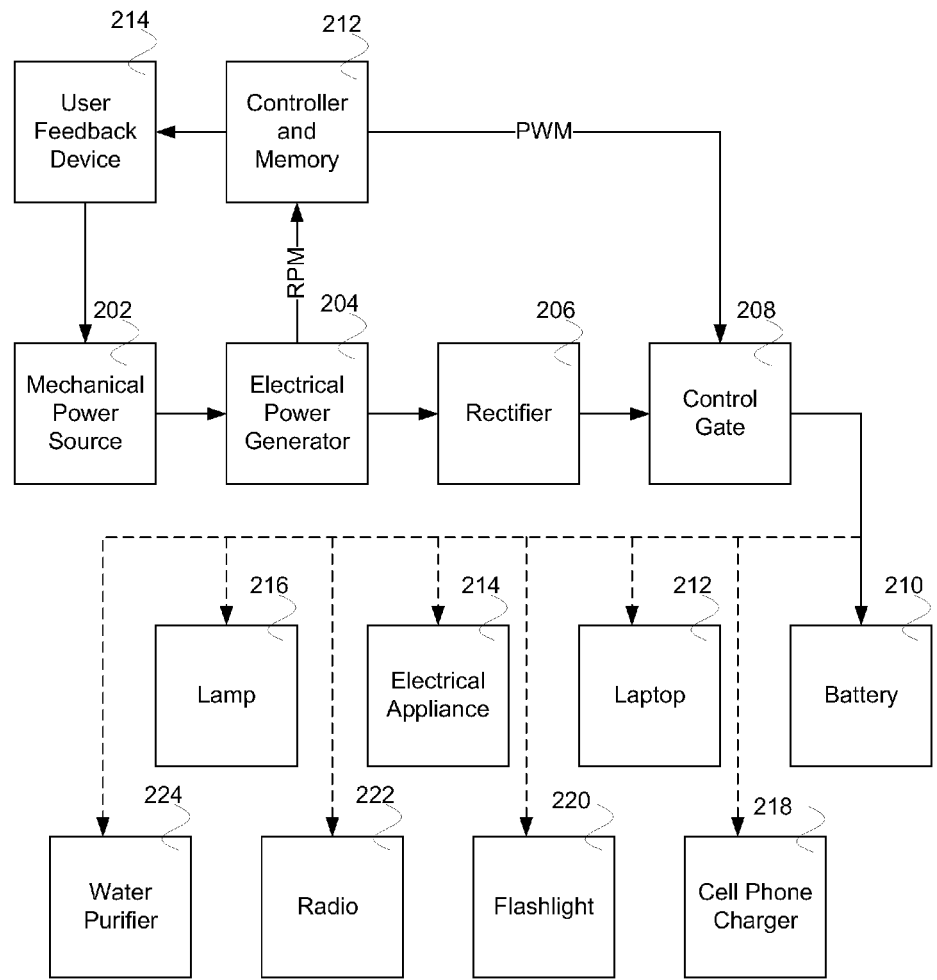
FIG. 2 is a block diagram illustrating an embodiment of a human power generating system.

FIG. 2 is a block diagram illustrating an embodiment of a human power generating system. In the example shown, mechanical power source 202 is coupled to electrical power generator 204. Electrical power generator 204 generates power using the motion generated by mechanical power source 202. Electrical power generator 204 provides a signal indicating mechanical activity (e.g., revolutions per minute (RPM) due to mechanical power source 202 input to electrical power generator 204) to controller and memory 212. Controller and memory 212 process information provided by the signal indicating mechanical activity and provide feedback to mechanical power source 202 (e.g., to a user pulling on a string). Feedback to mechanical power source 202 is provided using user feedback device 214. In various embodiments, user feedback device 214 comprises a light, a variable intensity light, a flashing light, a variable frequency flashing light, a sound, a variable pitched sound, a variable intensity sound, a vibration generator, or any other appropriate feedback device. In various embodiments, user feedback provides information regarding desired pacing of pulls, power generated (e.g., over/under power ratings), or any other appropriate user feedback information.

Electrical power generator 204 provides alternating current generated power to rectifier 206. Rectifier 206 rectifies the alternating current generated power output to provide direct current power output. In various embodiments, the voltage of the direct current power output is converted to a higher or a lower voltage and/or smoothed using a capacitor, or any other appropriate output conditioning. Rectifier 206 outputs to control gate 208. Control gate 208 is able to switch the power input to control gate 208 using a pulse width modulated switch before outputting to battery 210. Control gate 208 is switched based on a control signal from controller and memory 212.

In various embodiments, the rectifier is a passive rectifier or is an active rectifier (e.g., a synchronous rectifier). In some embodiments, the control gate 208 and rectifier 206 are combined using the switches of the active rectifier to pulse width modulate the output.

In some embodiments, there is no feedback provided to mechanical power source 202.

In various embodiments, mechanical power source 202 comprises a string being pulled, two strings being pulled, a bicycle, a rowing machine, a step machine, a treadmill, a windmill, a water wheel, or any other appropriate mechanical power source. In some embodiments, a rotating mechanical power source is coupled to the rotating rotor of the power generating unit without the use of a string to cause a bobbin to rotate.

In various embodiments, control gate 208 outputs to an electrical device 214 such as laptop 212, lamp 216, an LED light source, cell phone charger 218, radio 222, an entertainment device, flashlight 220, water purifier 224 (e.g., a UV water purifier), or any other appropriate device requiring electrical power. In various embodiments, control gate 208 is coupled to battery 210 or a capacitor to condition the power output from control gate 208. In various embodiments, the power stored in battery 210 can be used to run any appropriate device requiring electrical power.

In some embodiments, the average electrical power output from the device is at least 10 W. There are many consumer devices that consume <1 W of power (e.g., cell phones, iPods™, Gameboys™, global positioning system devices, cameras, lighting, etc.). Because there have been several psychological studies that show that people need at least a 10:1 reward to effort ratio for them to feel like an endeavor is worthwhile, a usage ratio of at least 10 to 1 (i.e., 10 minutes of use for 1 minute of effort) is targeted. Therefore, 10 W is a useful target for the design of the human power generating system.

Figure 3A:
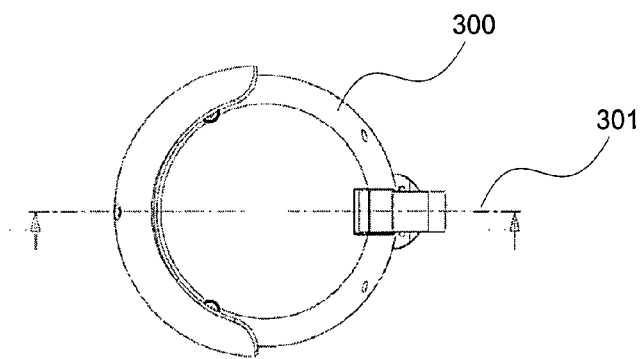
FIGS. 3A and 3B are diagrams illustrating embodiments of a human power generating system.
Figure 3B:
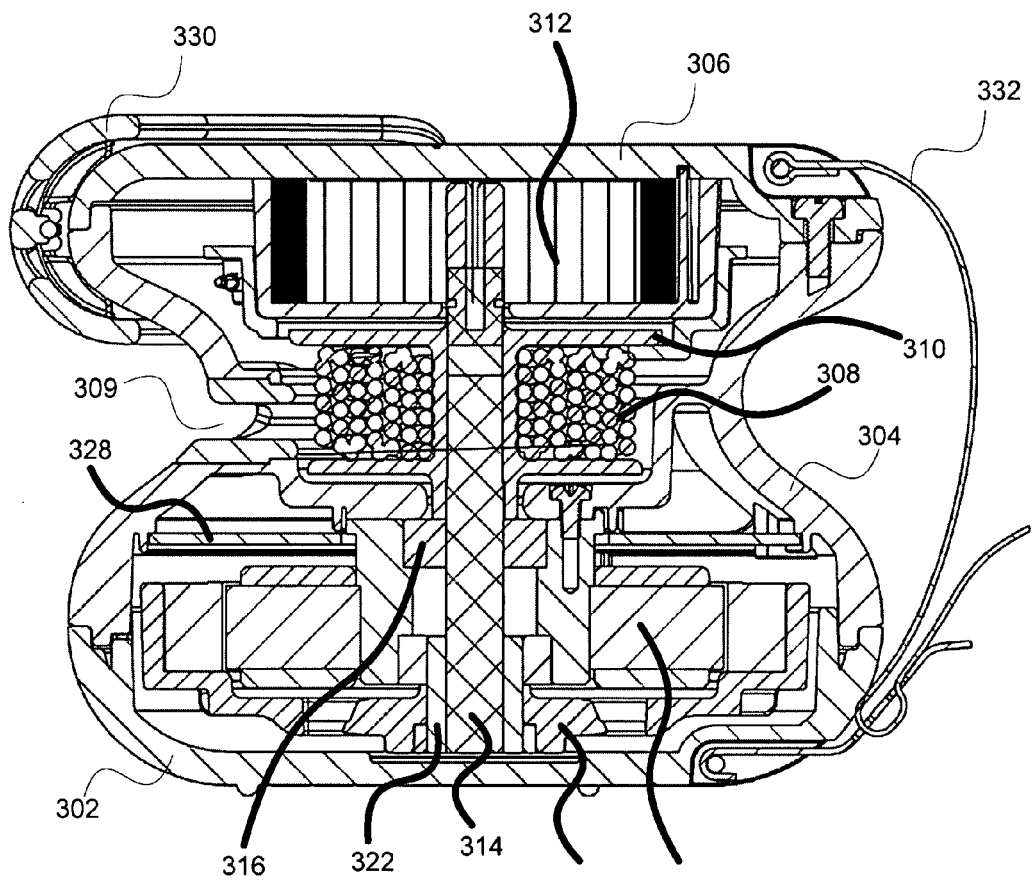

FIGS. 3A and 3B are diagrams illustrating embodiments of a human power generating system. In the example shown in FIG. 3A, power generating unit 300 is shown in a top view with a line 301 indicating a cut view line for FIG. 3B. In the example shown in FIG. 3B, power generating unit includes bottom of case 302, middle hour glass of case 304, top of case 306. String 308 is wrapped around the center of bobbin 310. String 308 is secured to bobbin 310 at one end. The other end of string 308 passes out a fairlead hole 309. The other end of string 308 is attached to a handle that enables a user to pull string 308, unwinding string 308 from bobbin 310. Bobbin 310 rotates while string 308 unwinds. Once unwound, string 308 is rewound around bobbin 310 by turning bobbin 310 using spring 312. The outer end of spring 312 is coupled to a housing that is in turn coupled to top of case 306 (not shown in FIG. 3B). The inner end of spring 312 is couple to bobbin 310 (not shown in FIG. 3B). On unwinding of string 308, bobbin 310 compresses energy into spring 312. The compressed energy in spring 312 is used to rewind string 308 around bobbin 310.

In some embodiments, spring 312 is not included in power generating unit 300 (e.g., a motor is used to rewind string 308 on bobbin 310 or a second string on bobbin 310 is used to rewind a first string such as string 308).

On unwinding of string 308, bobbin 310 rotates and turns shaft 314. Shaft 314 is coupled to bobbin 310 by having a keyed hole in bobbin 310 into which a corresponding keyed shaft 314 mates. In various embodiments, the keyed hole comprises a "D" shaped hole, a star shaped hole, a square hole, a hexagonal hole, a single flat, a dual flat, splined, or any other appropriate keyed hole enabling a rotation of bobbin 310 to be transmitted to shaft 314. Shaft 314 is coupled to sealing bearing 316. Sealing bearing 316 seals the lower chamber from the upper chamber. The upper chamber can be opened by opening top of case 306 and separating top of case 306 from middle hour glass of case 304. Opening the upper chamber allows access to the keyed end of shaft 314, bobbin 310, string 308, and spring 312. The lower chamber is sealed to prevent environmental contamination from affecting the electronic components in the lower chamber.

The lower chamber contents include clutch 322, rotor 324, stator 326, and circuit board 328. Clutch 322 couples shaft 314 to rotor 324. Clutch 322 enables a rotation of bobbin 310 to be transmitted to rotor 324 when string 308 is being unwound (e.g., as a user pulls string 308). Rotor 324 rotates with a ratio of 1:1 with a rotation of bobbin 310. Clutch 322 does not enable a rotation of bobbin 310 to be transmitted to rotor 324 when string 308 is being rewound (e.g., as string 308 is rewound on bobbin using, for example, a spring force).

Rotor 324 includes magnets (not indicated in FIG. 3B). In some embodiments, rotor 324 includes an inertial mass (not indicated in FIG. 3B). Stator 326 includes wire windings in which the current is generated from the motion of bobbin 310 and rotor 324.

Handle 330 detaches from the top of the hour glass case and is attached to one end of string 308 after passing out fairlead hole 309. Handle 330 can be pulled by a user to cause rotation of bobbin 310. Strap 332 can be used to anchor the power generating unit to a fixed object. A user can then pull on handle 330 without holding the case of the power generating unit. A user fatigues less quickly if only pulling on handle 330 and not also providing an anchoring force for the case than if pulling and anchoring.

FIGS. 4A and 4B are diagrams illustrating embodiments of a case for a human power generating system. In some embodiments, the case of FIGS. 4A and/or 4B comprise bottom of case 302, middle hour glass of case 304, top of case 306 of FIG. 3B. In the example shown in the projection view in FIG. 4A, the case for a human power generating system includes top of case 400, middle hour glass of case 402, and bottom of case 404. Top of case 400 and middle hour glass of case 402 form upper chamber 406. A bobbin, on which a string is wound, is accessible upon opening of top of case 400. The string passes out of upper chamber 406 through fairlead hole 410. Middle hour glass of case 402 and bottom of case 404 form lower chamber 408. Lower chamber 408 is designed to prevent the environment from affecting the electronic components of the power generating unit. Bottom of case 404 seals against middle hour glass of case 402 so that lower chamber 408 is sealed from environmental contamination (e.g., dust, dirt, water, etc.). In various embodiments, the seal between bottom of case 404 and middle hour glass of case 402 is sealed using ultrasonic welding, adhesive, an o-ring, a gasket, sealant, or any other appropriate way of achieving a seal.

In the example shown in the cut away view in FIG. 4B, the case for a human power generating system includes top of case 450, middle hour glass of case 452, and bottom of case 454. Top of case 450 and middle hour glass of case 452 form upper chamber 456. A bobbin, on which a string is wound, is accessible upon opening of top of case 450. The string passes out of upper chamber 456 through fairlead hole 460. Middle hour glass of case 452 and bottom of case 454 form lower chamber 458. Lower chamber 458 is designed to prevent the environment from affecting the electronic components of the power generating unit. Bottom of case 454 seals against middle hour glass of case 452 so that lower chamber 458 is sealed from environmental contamination (e.g., dust, dirt, water, etc.). In various embodiments, the seal between bottom of case 454 and middle hour glass of case 452 is sealed using ultrasonic welding, adhesive, an o-ring, a gasket, sealant, or any other appropriate way of achieving a seal.

FIGS. 5A and 5B are diagrams illustrating embodiments of a shaft, sealed bearing, and bobbin of a human power generating system. In the example shown in the exploded projection view in FIG. 5A, bobbin 500 includes top post 502 which is slit to hold one end of a spring. The spring provides a rewinding force on bobbin 500 enabling bobbin 500 to rewind the string after a user has pulled the string to unwind it. Keyed end 504 of shaft 506 is fit through sealed bearing 508 into the bottom of bobbin 500. Keying enables a rotation of bobbin 500 to be efficiently translated to a rotation of shaft 506, while also allowing easy removal of bobbin 500 from shaft 506. Sealed bearing 508 holds shaft 506 and seals the opening between an upper and lower chamber of a case for a human power generating unit. Shaft 506 couples to a rotor of a generator in the lower chamber of the case.

In the example shown in the compressed projection view in FIG. 5B, bobbin 550 includes top post 552 which is slit to hold one end of a spring. The spring provides a rewinding force on bobbin 550 enabling bobbin 550 to rewind string 560 after a user has pulled string 560 to unwind it. In various embodiments, string 560 is coupled to bobbin 550 by passing through a hole in the axis post or side wall of bobbin 550 and tying a knot or tying a knot with the rest of string 560 (e.g., wrapping string 560 around the post of bobbin 560 and tying a knot to string 560 on the side where it entered the hole), or any other appropriate manner of coupling string 560 to bobbin 550. Keyed end of shaft 556 is fit through sealed bearing 558 into the bottom of bobbin 550. Keying enables a rotation of bobbin 550 to be efficiently translated to a rotation of shaft 556, while also allowing easy removal of bobbin 550 from shaft 556. Sealed bearing 558 holds shaft 556 and seals the opening between an upper and lower chamber of a case for the human power generating unit. Shaft 556 couples to a rotor of a generator in the lower chamber of the case.

In some embodiments the string 560 is chosen to be between 0.5 and 2 meters in length allowing a user to use a large motion when pulling on the string. During typical use a user maintains a consistent pace of pulling the string between 0.5 and 1.5 meters during each pull at a rate of one pull and one retraction each 0.5 to 1.5 seconds. The diameter of bobbin 580 and the diameter of string 560 are both chosen to achieve a certain minimum rotational speed of shaft 506. In some embodiments the diameter of bobbin 580 is chosen to be 9 mm, and the string diameter is chosen to be between 1 and 2 mm. For a typical user pulling a string 1 meter at a rate of one pull and one retraction each second, shaft 506 will rotate at a speed of 3000 RPM. In some embodiments, the diameter of bobbin 580 is chosen to be between 6 and 12 mm, and the string diameter is chosen to be between 0.5 and 4 mm. The speed of rotation of shaft 506 can be increased by decreasing the diameter of bobbin 580 or the diameter of the string, but there are tradeoffs: a smaller diameter of bobbin 580 will be more fragile and will also cause the string to rotate around a smaller radius of curvature, thus impacting the lifetime of the string; a smaller diameter string will have lower breaking strength and will abrade faster, thus decreasing lifetime. A choice of diameter of bobbin 580 and string diameter are made to achieve a long lifetime while still achieving a useful minimum rotational speed.

Figure 6:
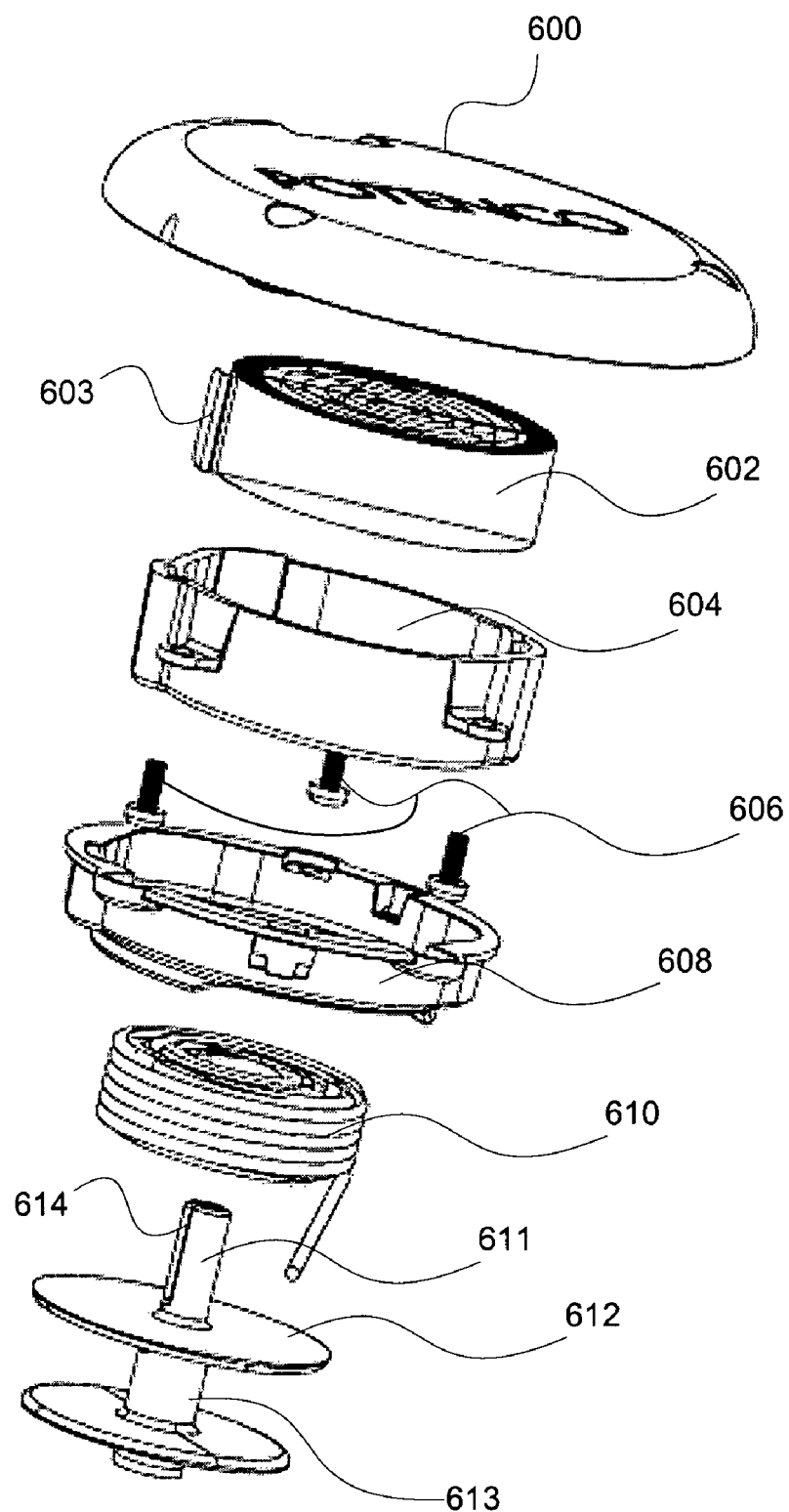
FIG. 6 is a diagram illustrating an embodiment of bobbin and spring rewinder of a human power generating system.

FIG. 6 is a diagram illustrating an embodiment of bobbin and spring rewinder of a human power generating system. In the example shown, spring 602 outer end is coupled with holding case 604 by having tab 603 at the outer end of spring 602 inserted into a slit of holding case 604 (not shown in FIG. 6). Holding case 604 is coupled to top of case 600 along with clamp ring 608 using one or more screws—represented in FIG. 6 by screws 606. Clamp ring 608 loosely couples bobbin 612 to top of case 600, such that bobbin 612 can freely rotate. Top post of bobbin 611 remains engaged with spring 602 even after the rewinder assembly is removed from the rest of the device. Slit 614 on top post of bobbin 611 couples with inner end of spring 602 such that when string 610 is wound on bobbin 612, spring 602 unwinds. And, when string 610 is unwound on bobbin 612, spring 602 winds. In some embodiments, spring 602 is selected such that spring 602 does not "bottom out" upon fully unwinding string 610 from bobbin 612. The diameter of the middle of the bobbin 613 is designed in order that when string 610 is pulled bobbin 612 turns rapidly enough to achieve a desired power output level. In some embodiments, the diameter is chosen to be in the range of 6 to 10 mm.

In some embodiments, before loading bobbin 612 with wound string 610 and spring 602 in its casing comprising clamp ring 608, holding case 604, and top of case 600 into the middle hour glass case (not shown in FIG. 6), slit 614 of bobbin 612 is used to engage spring 602 and preload spring 602.

Figures 7A, 7B, 7C:
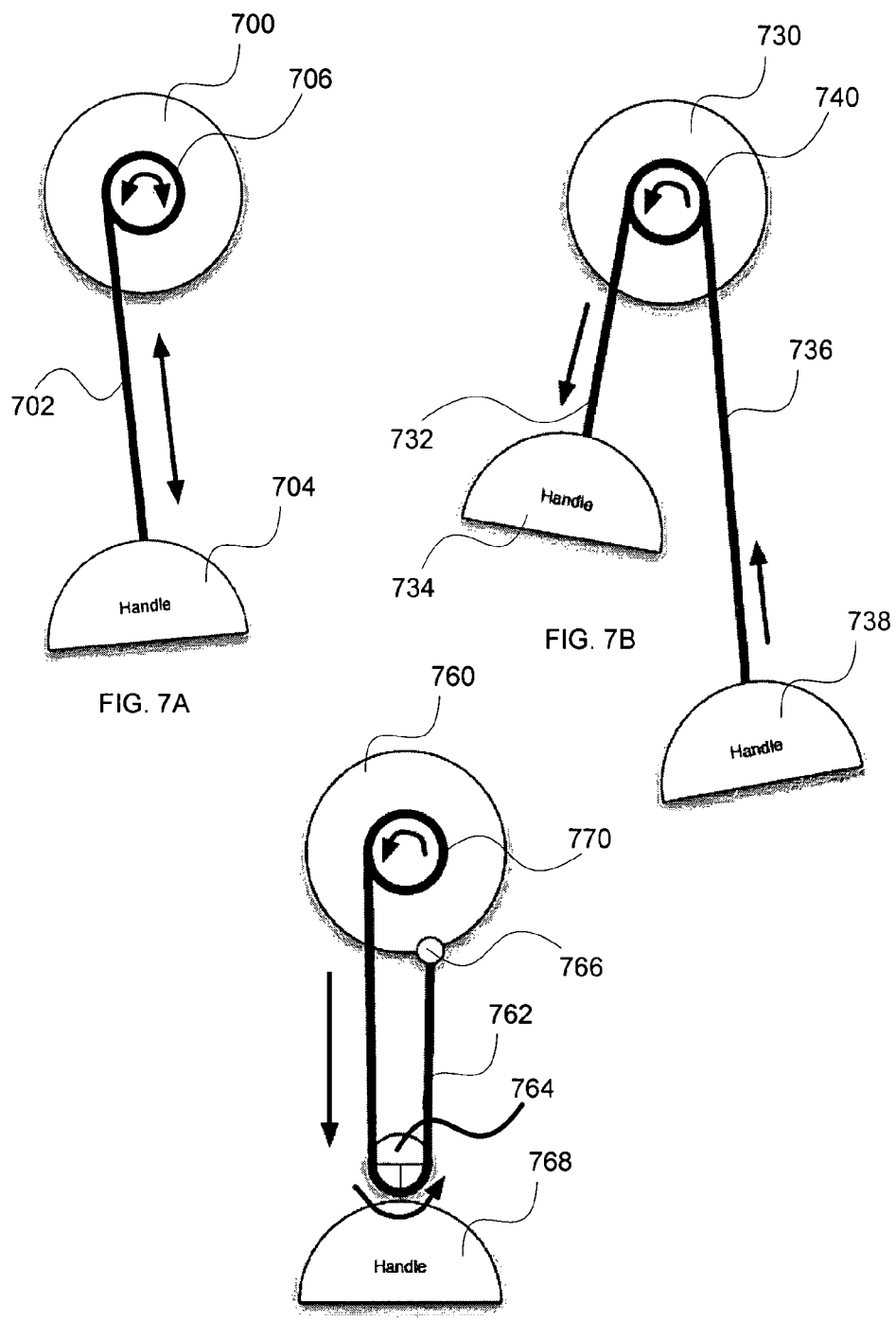
FIGS. 7A, 7B, and 7C are diagrams illustrating embodiments of pulling configurations for a human power generating system.

FIGS. 7A, 7B, and 7C are diagrams illustrating embodiments of pulling configurations for a human power generating system. In the example shown in FIG. 7A, power generating unit 700 includes bobbin 706 which turns when string 702 winds or unwinds on bobbin 706. String 702 unwinds when handle 704 is pulled away from power generating unit 700. String 702 winds when handle 704 is let loose and a spring or motor enables string 702 to be retracted.

In the example shown in FIG. 7B, power generating unit 730 includes bobbin 740. Bobbin 740 turns when string 732 winds or unwinds on bobbin 740 or when string 736 winds or unwinds on bobbin 740. String 732 unwinds when handle 734 is pulled away from power generating unit 730. String 736 unwinds when handle 738 is pulled away from power generating unit 730. String 732 winds when handle 734 is let loose and handle 738 is pulled. String 736 winds when handle 738 is let loose and handle 734 is pulled. In various embodiments, string 732 is the same or is different from string 736.

In the example shown in FIG. 7C, power generating unit 760 includes bobbin 770 which turns when string 762 winds or unwinds on bobbin 770. String 762 unwinds when handle 768 is pulled away from power generating unit 760. Handle 768 pulls on wheel 764 around which string 762 is wrapped. String 762 is anchored on power generating unit 760 using anchor 766. For a pull of handle 768 a distance 'x' away from power generating unit 760, a length of string 762 two times distance 'x' is pulled off of bobbin 770. String 762 winds when handle 768 is let loose and a spring or motor enables string 762 to be retracted.

In some embodiments, more complex pulley arrangements are used instead of the simple pulley shown in FIG. 7C. These pulley arrangements can be used when the mechanical pulling force is sufficient for pulling the increased force required by using a complex pulley.

FIGS. 8A and 8B are block diagrams illustrating embodiments of a shaft, sealed bearing, and bobbin of a human power generating system. In the example shown in the exploded projection view in FIG. 8A, bobbin 800 includes keyed hole 802 which enables keyed end 810 of shaft 812 to couple with bobbin 800. Bobbin 800 includes top winding space 804 for a first string to be wound in a first direction and bottom winding space 806 for a second string to be wound in a second direction. Pulling on the first string unwinds the first string and rewinds the second string. Pulling on the second string unwinds the second string and rewinds the first string. Keyed end 810 of shaft 812 is fit through sealed bearing 808 through bobbin 800. Bobbin 800 is secured on shaft 812 using clip ring 814 which is inserted into clip ring slot 816 on shaft 812. Keying enables a rotation of bobbin 800 to be efficiently translated to a rotation of shaft 812. Sealed bearing 808 holds shaft 812 and seals the opening between an upper and lower chamber of a case for a human power generating unit. Shaft 812 couples to a rotor of a generator in the lower chamber of the case.

In the example shown in the compressed projection view in FIG. 5B, bobbin 850. String 854 is wound around bottom winding space (not indicated in FIG. 5B) of bobbin 850, and string 856 is wound around top winding space (not indicated in FIG. 5B) of bobbin 850. Pulling on the string 854 unwinds the string 854 and rewinds the string 856. Pulling on the string 856 unwinds the string 856 and rewinds the string 854. Note that no spring or motor is required to rewind string 856, so that hardware associated with string 856 is not used. In various embodiments, string 854 and/or string 856 is coupled to bobbin 850 by passing through a hole in the axis post or side wall of bobbin 850 and tying a knot or tying a knot with the rest of string 854 or string 856 respectively (e.g., wrapping string 854 around the post of bobbin 850 and tying a knot to string 854 on the side where it entered the hole), or any other appropriate manner of coupling string 854 and/or string 856 to bobbin 850. Keyed end 860 of shaft 862 is fit through sealed bearing 858 and through bobbin 850. Bobbin 850 is secured to shaft 862 using clip ring 864. Keying enables a rotation of bobbin 850 to be efficiently translated to a rotation of shaft 862. Sealed bearing 858 holds shaft 862 and seals the opening between an upper and lower chamber of a case for the human power generating unit. Shaft 862 couples to a rotor of a generator in the lower chamber of the case.

When using bobbin 850 (or bobbin 800), a restoring spring is not used. Further, an inertial mass for storing energy during the retraction of a string is also not used. A clutch is not required to only transmit rotation of bobbin 850 (or bobbin 800) to a generator rotor in one rotational direction.

Figure 9A:
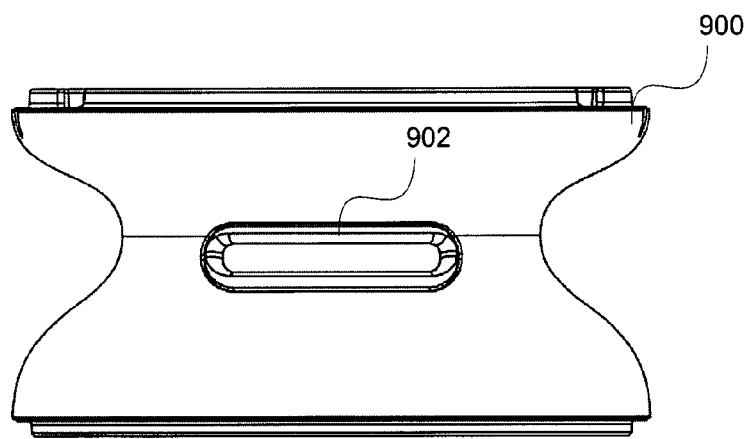
FIGS. 9A and 9B are diagrams illustrating embodiments of fairlead holes.
Figure 9B:
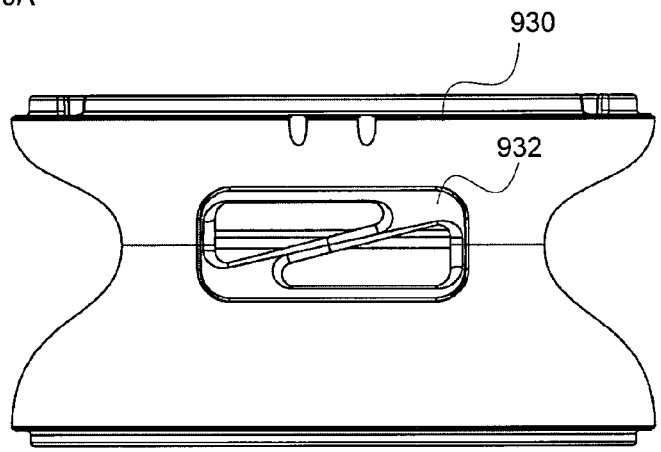

FIGS. 9A and 9B are diagrams illustrating embodiments of fairlead holes. In the example shown in FIG. 9A, middle hour glass case 900 includes an opening for fairlead 902. Fairlead 902 creates a fairlead hole through which a string can pass. The fairlead hole is designed to minimize wear on the string as the string is pulled out and retracted in through the fairlead hole. Fairlead 902 is designed such that the string spends as little time against the side wall of fairlead 902 as possible (e.g., the opening is bigger than the diameter of the string—for example, an opening of approximately 3.75 mm by 27 mm with a string diameter of 1 to 2 mm). Also, the edge of fairlead 902 is given a profile that reduces the angle of bending when the string bends around fairlead 902. In various embodiments, an elliptical curve, a substantially elliptical, a portion of an elliptical curve, or any other appropriate curve for reducing bending is used for the wall of fairlead 902.

In the example shown in FIG. 9B, middle hour glass case 930 includes an opening for fairlead 932. Fairlead 932 creates two fairlead holes through which two strings can pass. The fairlead holes are designed to minimize wear on the strings as each string is pulled out and retracted in through each fairlead hole. Fairlead 932 is designed such that the string spends as little time against the side wall of fairlead 932 as possible (e.g., the opening is bigger than the diameter of the string—for example, an opening of between approximately 3.75 mm and 6 mm tall by 20 mm wide with a string diameter of 1 to 2 mm). Also, the edge of fairlead 932 is given a profile that reduces the angle of bending when the string bends around fairlead 932 for a typical use. In various embodiments, an elliptical curve, a substantially elliptical, a portion of an elliptical curve, or any other appropriate curve for reducing bending is used for the wall of fairlead 932.

Figure 9C:
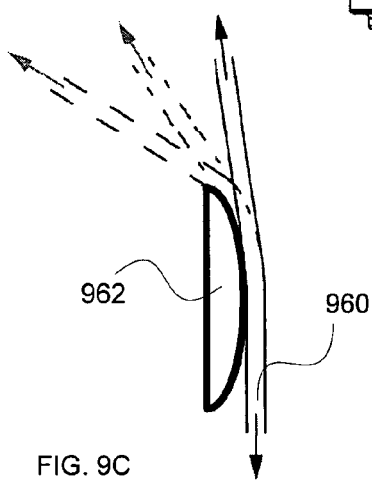

FIG. 9C is a block diagram illustrating an embodiment of a fairlead wall. In the example shown, string 960 bends around fairlead wall 962. A typical use has string 960 bent at small angles around fairlead wall 962. For this case, a stretched shape similar to an ellipse has less bending to string 960 than a common circular fairlead wall profile. More bending leads to greater wear, so the stretched shape similar to an elliptical profile leads to longer string life.

Figures 10A, 10B:
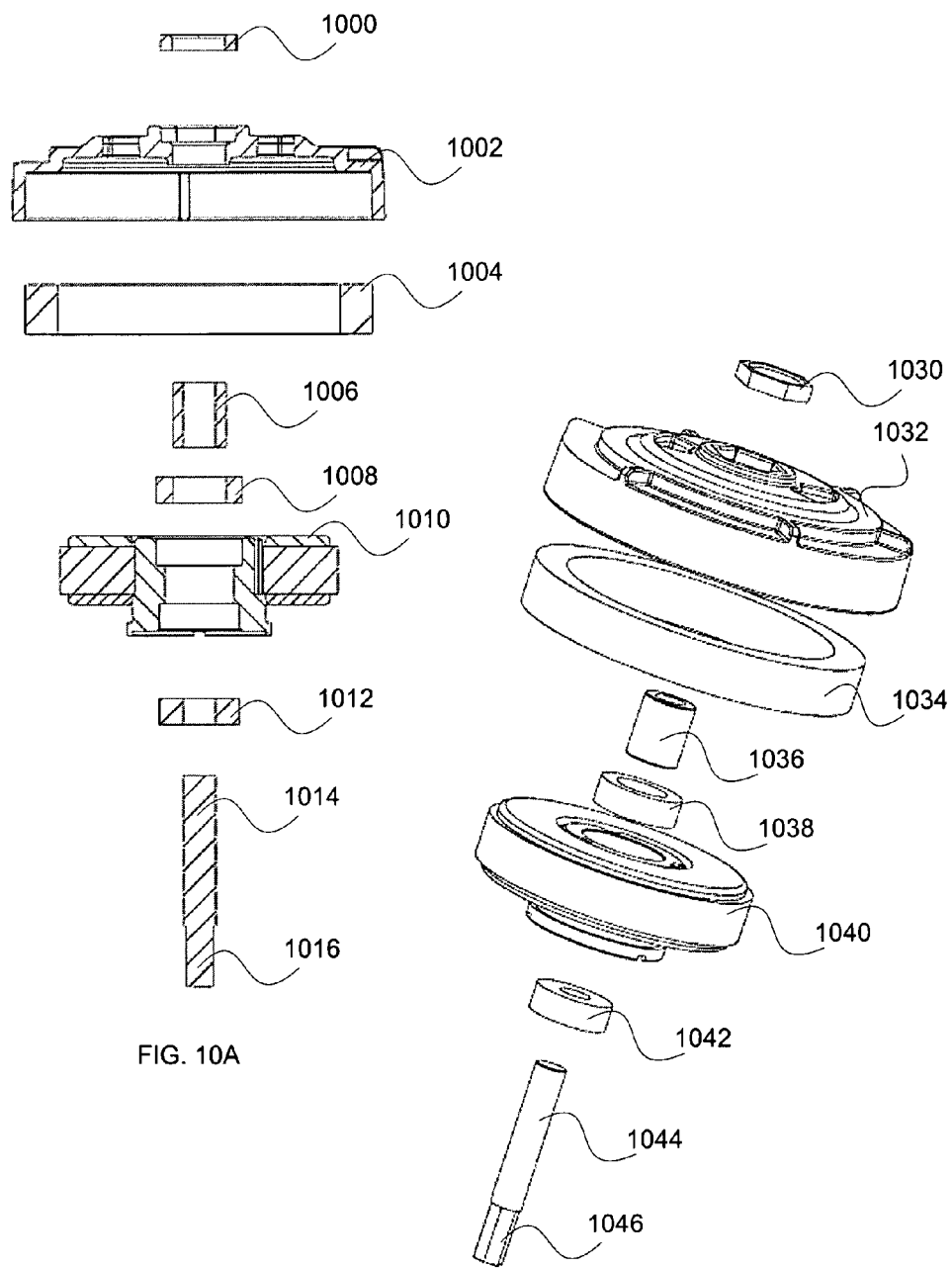
FIGS. 10A and 10B are block diagrams illustrating embodiments of a generator.

FIGS. 10A and 10B are block diagrams illustrating embodiments of a generator. In the example shown in the cut away view in FIG. 10A, shaft 1014 is coupled to sealed bearing 1012. Shaft 1014 has keyed end 1016 which couples to a mechanical energy source (e.g., a bobbin caused to rotate by pulling a string). Shaft 1016 is coupled to clutch 1006. Clutch 1006 allows rotation of shaft 1016 to be translated to a rotation of rotor in one direction (e.g., the direction of rotation when a string is pulled rotating a bobbin coupled to shaft 1016). In some embodiments, clutch 1006 comprises a needle roller clutch. Clutch 1006 is coupled to rotor cap 1002 using hex nut 1000. Rotor cap 1002 is coupled to magnet ring 1004. Bearing 1008 allows clutch 1006 to turn and stator 1010 to remain stationary. In some embodiments, inertial mass stores energy when a string is retracting, and so rotor cap 1002 is made more massive (e.g., made out of steel, made of two metals such as lead and steel). In some embodiments, inertial mass does not store energy when a string is retracting, and so is kept as light as possible (e.g., made out of plastic)—for example, in the push-pull string configuration shown in FIG. 7B.

In the example shown in the perspective view in FIG. 10B, shaft 1044 is coupled to sealed bearing 1042. Shaft 1044 has keyed end 1046 which couples to a mechanical energy source (e.g., a bobbin caused to rotate by pulling a string). Shaft 1046 is coupled to clutch 1036. Clutch 1036 allows rotation of shaft 1046 to be translated to a rotation of rotor in one direction (e.g., the direction of rotation when a string is pulled rotating a bobbin coupled to shaft 1046). In some embodiments, clutch 1036 comprises a needle roller clutch. Clutch 1036 is coupled to rotor cap 1032 using keyed torque transmitter 1030 (e.g., a hex nut). In various embodiments, keyed torque transmitter 1030 comprises a star nut, a square nut, a double-D nut, a D nut, a hex nut, or any other appropriate shape enabling firm or non-slipping coupling between a clutch and a rotor. If rotor cap 1032 is made of a soft material such as plastic, and the keyed torque transmitter 1030 is not included, then the clutch 1036 will slip when delivering torque to rotor cap 1032. Rotor cap 1032 is coupled to magnet ring 1034. Bearing 1038 allows clutch 1036 to turn and stator 1040 to remain stationary.

Figure 11:
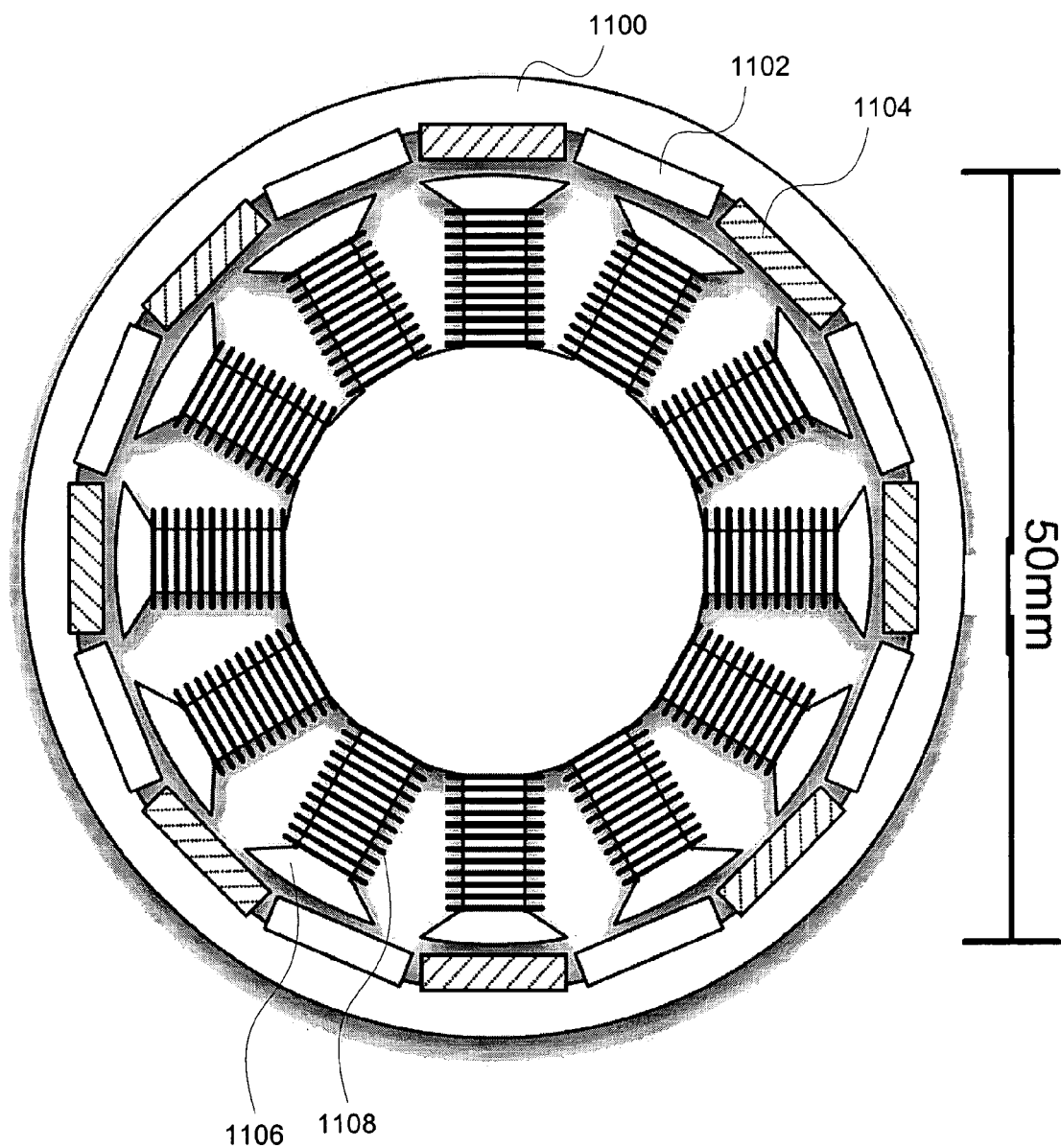
FIG. 11 is a diagram illustrating an embodiment of the wiring of a stator and the magnets and inertial mass of a rotor.

FIG. 11 is a diagram illustrating an embodiment of the wiring of a stator and the magnets and inertial mass of a rotor. In the example shown, inertial mass 1100 is coupled to magnets that alternate their polarity. In some embodiments, the inertial mass comprises a steel cap with an outer diameter of approximately 70 mm. For example, magnet 1102 and magnet 1104 present a magnetic field with opposite polarities to a stator core and stator windings such as stator core 1106 and windings 1108. In some embodiments, inertial mass 1100 comprises a steel ring with inner radius approximately 65 mm, outer radius approximately 70 mm, height approximately 20 mm, and mass 200 g. In some embodiments, windings 1108 are configured in 3 phases, such that every third armature is connected together. In some embodiments, windings 1108 comprise 30 turns of wire per armature, and the wire is 0.6 mm in diameter such that a rotational speed on the motor of 3000 RPM results in an open-circuit voltage of 18.3 V, and when connected to a 10 Ohm load the voltage is 11.3 V. Windings 1108 are designed such that the trade off of the sizing of the wire, due to spatial constraints, and the length of the wire, due to a resistance constraint/power loss constraint, are appropriately made to achieve a human power generating unit capable of delivering 20 W into a target device load when the generator is rotating at 3000 RPM.

In some embodiments, inertial mass 1100 is designed such that when a user operates the power generating unit pulling the string to achieve a rotation of the rotor of 360° rotations per minute (RPM), the power generating unit is able to provide constant power of 15 W by storing energy in the rotating inertial mass when the string is unwinding and then delivering that stored energy during the rewinding of the string. The energy output from the device is limited to 15 W during the string unwinding so that the extra energy can be stored as rotational energy in the inertial mass.

An electrical power generator may be modeled by a speed-controlled voltage source, in series with a Thevenin resistance. The voltage of the source is linearly proportional to the shaft speed of the electrical power generator. Therefore, the maximum power that may be drawn from the electrical power generator is proportional to the square of the shaft speed:

$$V\_oc = k*\text{omega}$$

$$P\_max = \tfrac{1}{2} V\_oc * \tfrac{1}{2} I\_sc$$

$$I\_sc = V\_oc / R\_thevenin$$

Therefore, P_max=V_oc^2/(4*R_thevenin)=k^2*omega^2/(4*R_thevenin). It may be shown that the maximum power point for any particular shaft speed is at half the open-circuit voltage, and half the short-circuit current.

If a small radius generator is used, the magnet mass that can be effectively used is small. This means the amount of energy absorbed per rotation is also small. A problem is that this dictates low power outputs for reasonable shaft rotation speeds. In other words, a small radius results in a small value of k, above. To couple the electrical power generator effectively to human body motions without the use of gears, a electrical power generator must be chosen with large enough k. Since k varies as the physical volume of the electrical power generator, this condition dictates, for a given magnet quality, a minimum physical volume for the electrical power generator.

In designing an electrical power generator with a sufficiently large enough physical volume, one may choose to make it axially long and/or radially fat. But while volume is proportional to r^2*length, the area of magnets required is proportional to only r*length. In order to make economic use of magnets, it is advantageous to maximize r. In some embodiments, short, fat generators, are thus chosen typically with a diameter to length ratio of between 4 and 6, although other ratios can also be used.

Once the armature shape of the electrical power generator is chosen, a wire diameter is selected for the windings to match the output voltage at a humanly realizable speed, to the voltage of the batteries being charged, or the desired input voltage of the equipment to be run. This speed is called the "cut in" speed.

In order to be able to modulate the coupling electronically, the cut-in speed should be lower than the average expected use speed, called "design speed" throughout this specification. In some embodiments, the cut-in speed is chosen to be about one third of the design speed.

FIGS. 12A, 12B, and 12C are diagrams illustrating embodiments of a human power generating system. In the example shown in FIG. 12A, user 1200 using hand 1202 and hand 1204, pulls on string 1203 and string 1205, respectively, which are coupled to power generating unit 1206. String 1203 and string 1205 cause a rotor to turn in power generating unit 1206 and, thereby, electric power to be generated. To ease user 1200 pulling on string 1203 and string 1205 power generating unit 1206 includes an integral strap 1208 that enables power generating unit 1206 to be anchored to a fixed object (e.g., fixed object 1210). In various embodiments, strap 1206 is anchored to a strap, a tree, a post, a fixed ring, a tether, or any other appropriate object to anchor power generating unit 1206.

In the example shown in FIG. 12B, user 1230 using foot 1232 and foot 1234, pulls on string 1233 and string 1235, respectively, which are coupled to power generating unit 1236. String 1233 and string 1235 cause a rotor to turn in power generating unit 1236 and, thereby, electric power to be generated. To enable user 1230 pulling on string 1233 and string 1235 power generating unit 1236 includes an integral strap 1238 that enables power generating unit 1236 to be anchored to a fixed object (e.g., belt 1240).

In the example shown in FIG. 12C, user 1260 using hand 1262 and hand 1264, pulls on string 1263 and string 1265, respectively, which are coupled to power generating unit 1266. String 1263 and string 1265 cause a rotor to turn in power generating unit 1266 and, thereby, electric power to be generated. To ease user 1260 pulling on string 1263 and string 1265 power generating unit 1266 includes an integral strap 1268 that enables power generating unit 1266 to be anchored to a fixed object (e.g., foot 1270).

Figure 13:
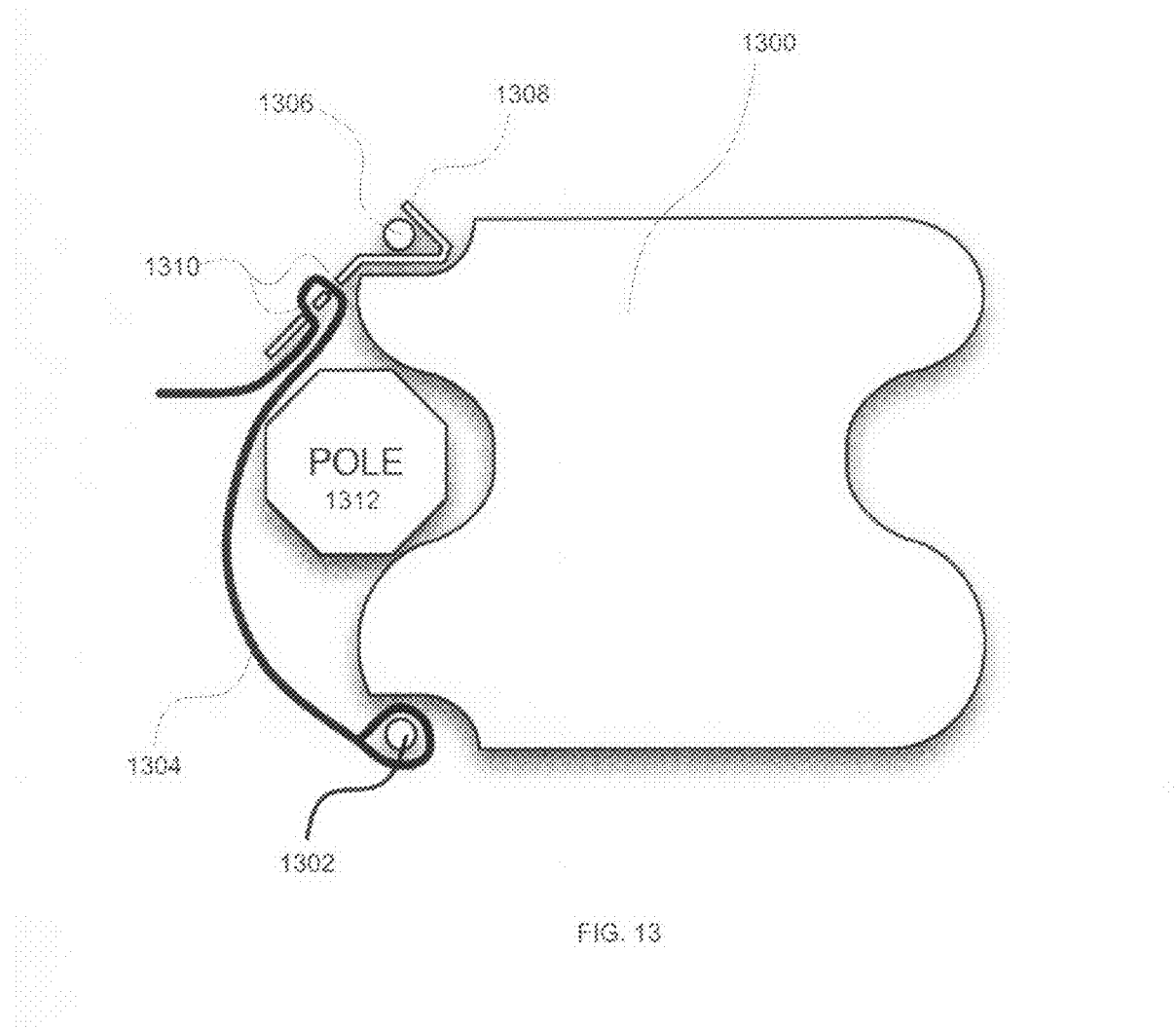
FIG. 13 is a diagram illustrating an embodiment of an integral anchoring attachment for a power generating unit.

FIG. 13 is a diagram illustrating an embodiment of an integral anchoring attachment for a power generating unit. In the example shown, power generating unit 1300 includes post 1302 and post 1306. Strap 1304 is constrained by post 1302 so that strap is integral to power generating unit 1300. Strap 1304 is coupled to hook 1308 using pass through holes 1310. Hook 1308 can be released from and can be hooked around post 1306. When hook 1308 is hooked around post 1306, power generating unit 1300 is anchored (e.g., as is shown in FIG. 13 where power generating unit 1300 is anchored to pole 1312). Anchoring power generating unit 1300 enables a user to generate power by pulling on the strings of power generating unit 1300 (not shown in FIG. 13) with less fatigue then when also anchoring power generating unit 1300 by holding with a hand. Additionally, anchoring improves the use of the push-pull configuration as shown in FIG. 12A.

FIGS. 14A and 14B are diagrams illustrating embodiments of connector systems for a power generating unit case. In the example shown in FIG. 14A, middle hour glass case 1400 includes a first connector system (e.g., threads 1402) for connecting middle hour glass case 1400 to top of case 1404. The chamber formed by middle hour glass case 1400 and top of case 1404 is designed to hold a primary mechanical turning source such as a bobbin that rotates as a string is wound or unwound in response to a string being pulled or retracted. In various embodiments, the first connector system comprises a bayonet connector system (e.g., push and twist to lock), a sleeve mount (e.g., a cylinder, square, or hexagon that top of case 1404 slide down and locks via friction, set screw, thumb screw, latch, etc.), a spline mount, a clip connector system, a snapping connector system, or any other appropriate connector system for connecting top of case 1404 and middle hour glass case 1400.

In the example shown in FIG. 14B, a second connector system (e.g., screw holes 1450) is also included in middle hour glass case 1452 (shown as a top view in FIG. 14B). The second connector system enables middle hour glass case 1452 to be attached or coupled to a secondary mechanical turning source for turning the shaft of the power generating system of middle hour glass case 1452. For example, a bicycle, turn wheel, propeller, a belt, or any other mechanical turning source for the shaft is coupled to the power generating system and the second connector system is used to mount the power generating system appropriately. This enables the power generating system to take advantage of any mechanical turning source of energy including animals, wind mills, exercise devices (e.g., bicycles, walkers, rowing machines, step machines, etc.), water wheels, etc.

Figure 15A:
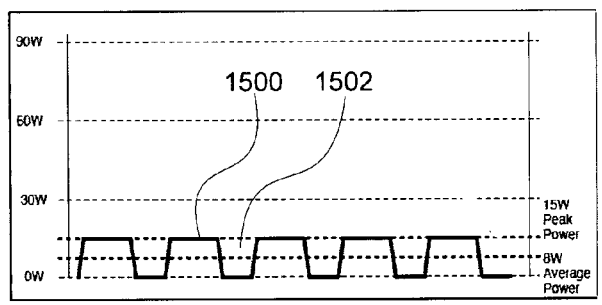
FIGS. 15A and 15B are graphs illustrating the power generated from a human power generating system in two embodiments.
Figure 15B:
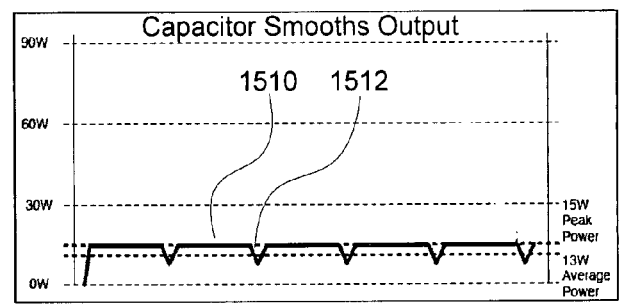

FIGS. 15A and 15B are graphs illustrating the power generated from a human power generating system in two embodiments. In the example shown in FIG. 15A, as indicated by region 1500 in the graph, power is generated during the time when the string is being pulled causing a rotor in a generator to turn. In the example shown, output power is limited to 15 W. Power is not generated during the time when the string is being retracted as indicated by region 1502 in the graph.

X-axis of the graph indicates the amount of power generated, and y-axis of the graph indicates time.

In the example shown in FIG. 15B, the output of the power generating unit is essentially constant. In the time corresponding to when the string is being pulled, energy that is generated is both output from the unit and also stored in a stored energy source. In the time corresponding to when the string is being retracted, energy is drained from the stored energy source. Time region when the power is constant 1510 is larger than the time when the stored energy source cannot keep the output power constant 1512. The stored energy source for FIG. 15B comprises a 0.3 F super capacitor. In the example shown, output power is limited to 15 W. X-axis of the graph indicates the amount of power generated, and y-axis of the graph indicates time.

Figure 15C:
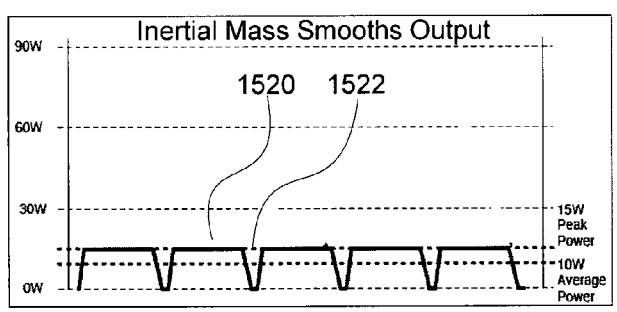

In the example shown in FIG. 15C, the output of the power generating unit is essentially constant. In the time corresponding to when the string is being pulled, energy that is generated is both output from the unit and also stored in a stored energy source. In the time corresponding to when the string is being retracted, energy is drained from a stored energy source. Time region when the power is constant 1520 is larger than the time when the stored energy source cannot keep the output power constant 1522. The stored energy source for FIG. 15C comprises an inertial mass that stores rotational energy. In the example shown, output power is limited to 15 W. X-axis of the graph indicates the amount of power generated, and y-axis of the graph indicates time.

In some embodiments, the output power generating unit output can be further regulated using an output power limiter. The output power limiter determines the total power generated in a cycle of pulling and retracting and sets the overall output level such that a constant output can be achieved. In other words, the reserve power in the stored energy source is sufficient to provide the output power during the retracting of the string. Output power can be limited by switching a switch to disconnect the output from the power generation circuitry in the power generating unit.

In some embodiments, power output is limited by a receiving device (e.g., an input to a laptop power supply).

Figure 16:
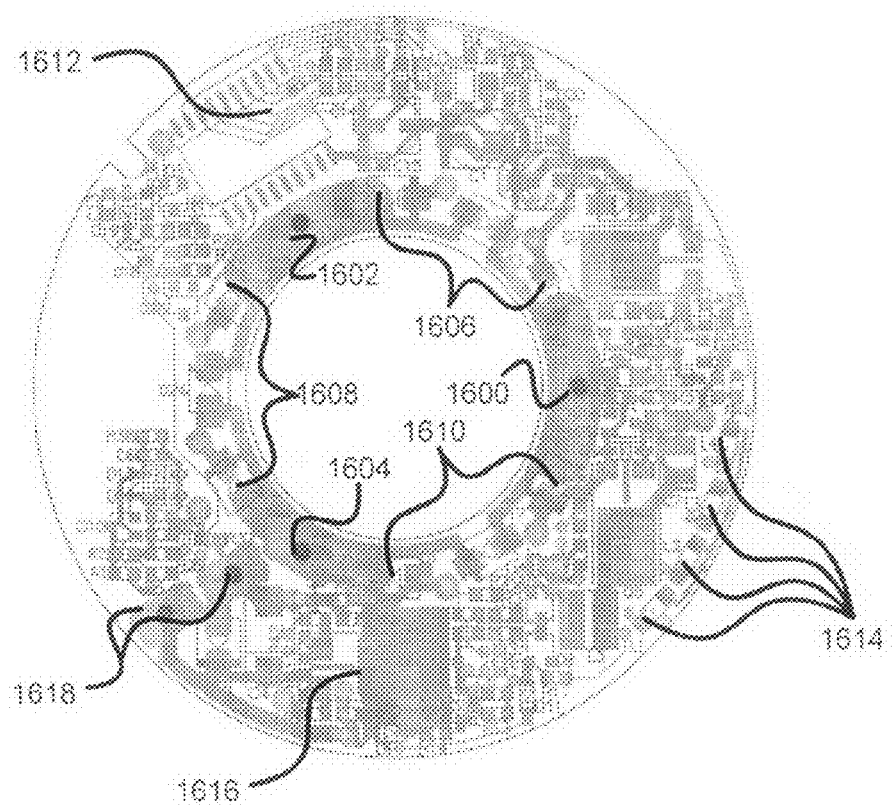
FIG. 16 is a diagram illustrating an embodiment of a circuit board.

FIG. 16 is a diagram illustrating an embodiment of a circuit board. In some embodiments, the circuit board of FIG. 16 comprises circuit board 328 of FIG. 3B. In the example shown in top view of circuit board FIG. 16, circuit board receives current at contact 1600, contact 1602, and contact 1604 produced by generator from coils in stator. Diodes 1606, diodes 1608, and diodes 1610 rectify received current. Memory and controller 1612 provides feedback to user and controls output power. Feedback to user is provided using light emitting diodes 1614. Output power is controlled using switch 1616. Controlling output power also controls a resistance a user feels when pulling a string connected to generator. Output is connected to output contacts 1618.

Figure 17:
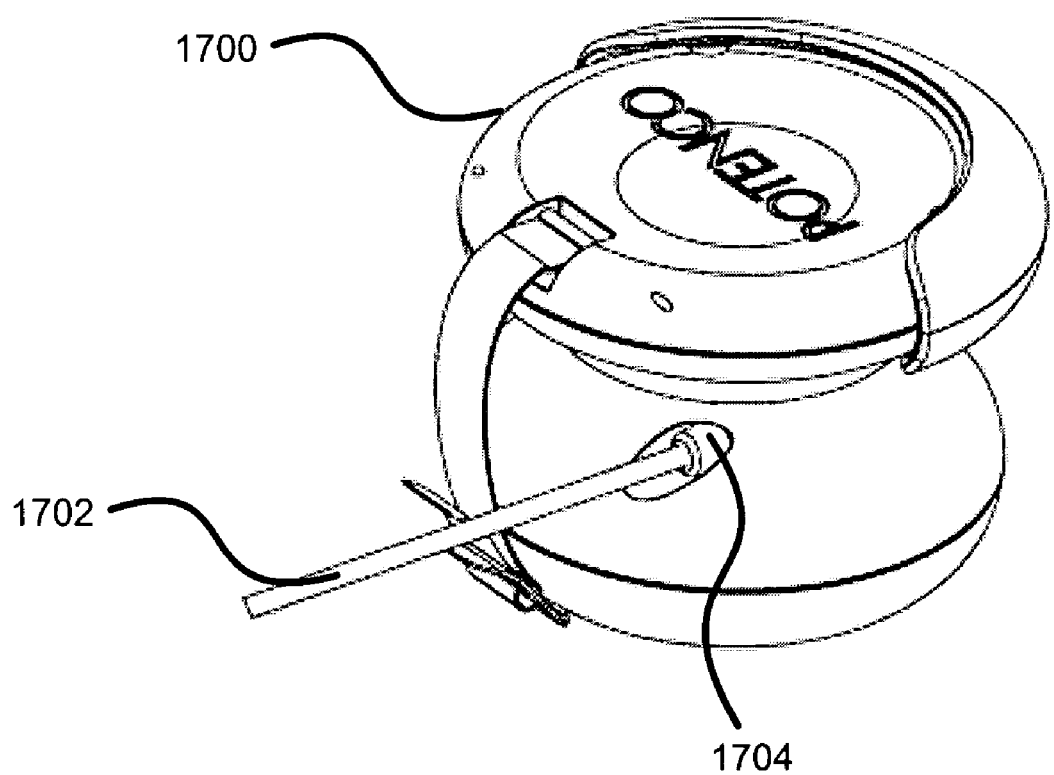
FIG. 17 is a diagram illustrating an embodiment of an output cable and connector.

FIG. 17 is a diagram illustrating an embodiment of an output cable and connector. In the example shown, power generating unit 1700 outputs power using cable 1702. Cable 1702 is coupled to connector 1704 which enables an electrical connection between cable 1702 and a circuit board of power generating unit 1700 (e.g., contacts 1618 of FIG. 16). Connector 1704 provides strain relief with case of power generating unit 1700 in the event that cable 1702 is pulled. Connector 1704 also provides sealing of the sealed chamber holding the electronics and generator of the power generator unit against contamination (e.g., water, dust, sand, etc.).

Figure 18:
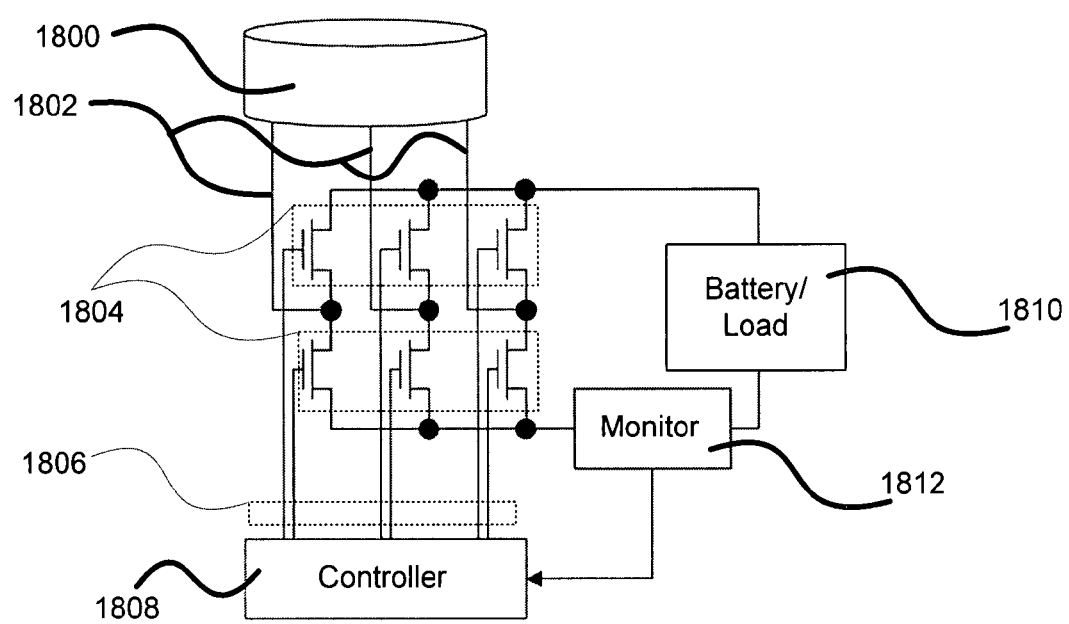
FIG. 18 is a diagram illustrating an embodiment of a retraction circuit.

FIG. 18 is a diagram illustrating an embodiment of a retraction circuit. In the example shown, the circuit is used to have the generator act as a motor such that the generator can be used to retract the string back onto the bobbin. Motor 1800 has three phases which are connected by three wires 1802 to six field effect transistors (FET's) 1804. FET's 1804 are selectively turned on or off by the control lines 1806 coming from controller 1808. The output of FET's 1804 is to battery/load 1810. Monitor 1812 monitors the amount of power being delivered to battery/load 1810.

In some embodiments, controller 1808 will selectively turn on/off FET's 1804 in such a way that they will synchronously rectify the AC output of the motor 1800 and deliver the rectified DC power to battery/load 1810. In some embodiments, monitor 1812 provides a signal to controller 1808 when the power is no longer being delivered, such as when a user has finished pulling on a string. When the power is no longer delivered controller 1808 can use FETs 1804 to drive motor 1800 in such a way as to rewind a string onto a bobbin, using a portion of the energy stored in battery/load 1810. In this manner motor 1800 is used as both an energy generator and also as a string rewinder.

In some embodiments, controller 1808 selectively turns on or off a control gate (not shown in FIG. 18) or FET's 1804 in order to adjust the amount of power flowing into battery/load 1810. In some embodiments, Hall effect sensors of motor 1800 measure the rotational speed of motor 1800 and are monitored by controller 1808. When a user is pulling and unwinding the string from the bobbin, motor 1800 will produce power that is rectified (e.g., by a diode rectifier) that passes to battery/load 1810. Once the user has finished pulling, the rotational speed of the motor will drop below a certain threshold for a certain time (i.e., the motor slows down for example to <500 RPM for a time period of at least 100 ms). Once the speed drops below the threshold, controller 1808 can selectively turn on and off FET's 1804 using standard motor commutation in such a way that the energy stored in battery/load 1810 is used to rotate motor 1800 thereby rewinding the string onto the bobbin.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An electric power generation system including:
    a handle;
    a string coupled to the handle and configured to be pulled using the handle;
    a bobbin configured to rotate when the string is unwound from the bobbin;
    an electric power generator having a rotor wherein the rotor is configured to rotate such that the ratio of number of rotations of the rotor and the bobbin is 1:1 when the string is being pulled, and wherein power generated is stored in a rotating mass or a battery;
    a user feedback device configured to provide an indication of power generated; and
    a case, wherein the case encloses the bobbin and the electric power generator, and wherein, in use, the case is handheld and portable.

2. A system as in claim 1, wherein the string has length such that a large motion can be used to pull the string.

3. A system as in claim 1, wherein the string is rewound on the bobbin when the string is retracting.

4. A system as in claim 3, wherein a spring force causes the string to retract.

5. A system as in claim 1, wherein a shaft is coupled to the bobbin.

6. A system as in claim 5, wherein a clutch is coupled to the shaft.

7. A system as in claim 6, wherein the rotor of the electric power generator is coupled to the clutch.

8. A system as in claim 6, wherein the clutch comprises a needle roller clutch.

9. A system as in claim 1, wherein the rotor turns fast enough to generate an average power out from the generator to power an electrical appliance.

10. A system as in claim 9, wherein the appliance comprises a laptop.

11. A system as in claim 9, wherein the appliance comprises a lamp.

12. A system as in claim 9, wherein the appliance comprises a cell phone charger.

13. A system as in claim 9, wherein the appliance comprises a water purifier.

14. A system as in claim 9, wherein the appliance comprises a radio.

15. A system as in claim 9, wherein the appliance comprises a flashlight.

16. A method for electric power generation comprising:
pulling on a string by pulling on a handle coupled to the string;
rotating a bobbin as the pulled string is unwound from the bobbin;
rotating a rotor of an electric power generator that is configured to rotate such that the ratio of number of rotations of the rotor and the bobbin is 1:1 when the string is being pulled, wherein a case encloses the bobbin and the electric power generator, and wherein, in use, the case is handheld and portable;
storing power generated in a rotating mass or a battery; and
providing an indication of power generated using a user feedback device.

* * * * *